US012452483B2

United States Patent
Ma et al.

(10) Patent No.: US 12,452,483 B2
(45) Date of Patent: Oct. 21, 2025

(54) MULTI-APPLICATION SCREEN RECORDING METHOD AND APPARATUS

(71) Applicant: Huawei Technologies Co., Ltd., Shenzhen (CN)

(72) Inventors: Li Ma, Beijing (CN); Qingbin Meng, Shenzhen (CN); Gang Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 55 days.

(21) Appl. No.: 18/575,501

(22) PCT Filed: Jun. 10, 2022

(86) PCT No.: PCT/CN2022/098273
§ 371 (c)(1),
(2) Date: Dec. 29, 2023

(87) PCT Pub. No.: WO2023/273845
PCT Pub. Date: Jan. 5, 2023

(65) Prior Publication Data
US 2024/0334005 A1    Oct. 3, 2024

(30) Foreign Application Priority Data
Jun. 30, 2021   (CN) .......................... 202110738194.5

(51) Int. Cl.
*H04N 21/433* (2011.01)
*G06F 9/451* (2018.01)
*G06F 9/455* (2018.01)

(52) U.S. Cl.
CPC ......... *H04N 21/4334* (2013.01); *G06F 9/451* (2018.02); *G06F 9/455* (2013.01)

(58) Field of Classification Search
CPC ...... H04N 21/4334; G06F 9/451; G06F 9/455
See application file for complete search history.

(56) References Cited

U.S. PATENT DOCUMENTS 9,378,385 B1 *  6/2016  Zhu ........................ G06F 21/577
10,114,733 B1 * 10/2018  Varghese .................. G06F 8/38
(Continued)

FOREIGN PATENT DOCUMENTS

| CN | 110417991 A | 11/2019 |
| CN | 111447475 A | 7/2020 |
| CN | 111768330 A | 10/2020 |

OTHER PUBLICATIONS

Baike little teacher, "Night god Android simulator records video", https://jingyan.baidu.com/article/455a99508578c7e0662778bd.html, Feb. 3, 2021, with English translation total 6 pages.
(Continued)

*Primary Examiner* — Sunghyoun Park
(74) *Attorney, Agent, or Firm* — Slater Matsil, LLP

(57) ABSTRACT

An electronic device receives a first operation in a window of a first application; in response to the first operation, performs screen recording on content of the window of the first application; receives a second operation in a window of a second application; and in response to the second operation, performs screen recording on content of the window of the second application. After performing screen recording on the content of the window of the second application for first duration, the electronic device stops screen recording performed on the content of the window of the first application. The first application and the second application are run in an Android system, and the window of the first application and the window of the second application are displayed in a non-Android system.

20 Claims, 28 Drawing Sheets

(56) References Cited

U.S. PATENT DOCUMENTS

2016/0154630 A1* 6/2016 Zang .................... G06F 8/34
                                                717/109
2016/0378989 A1* 12/2016 Park .................... G06F 21/566
                                                726/23
2019/0057724 A1* 2/2019 Sakamoto ............ G11B 27/105
2019/0349419 A1* 11/2019 Walsh .................. H04L 67/141

OTHER PUBLICATIONS

Anonymous, "Run apps on the Android Emulator", URL:https://developer.android.com/studio/run/emulator, Jun. 21, 2012, XP055586912, total 21 pages.

* cited by examiner

TO

TO

MULTI-APPLICATION SCREEN RECORDING METHOD AND APPARATUS

CROSS REFERENCE TO RELATED APPLICATIONS

This application is a National Stage of International Application No. PCT/CN2022/098273 filed on Jun. 10, 2022, which claims priority to Chinese Patent Application No. 202110738194.5, filed on Jun. 30, 2021, both of which are hereby incorporated by reference in their entireties.

TECHNICAL FIELD

This application relates to the field of terminals, and in particular, to a multi-application screen recording method and an apparatus.

BACKGROUND

With popularization of smartphones and mobile networks, the mobile game industry continuously grows, and mobile game experience develops into immersive experience. However, when a user plays a game on a mobile phone, problems such as fast power consumption, overheating, finger blockage, and operation inaccuracy may exist, which compromise user experience. In view of this, Android emulators emerge. The Android emulator can emulate an Android operating system on a non-Android system (for example, a computer operating system) to install, run, or uninstall Android applications on a computer. In this way, the user can experience Android games and other Android applications on the computer.

The Android emulator may implement functions such as keyboard and mouse mapping, game assistance, screen capture, and screen recording. Screen recording is an indispensable one of these functions. However, currently, the Android emulator supports only single-window screen recording. After a plurality of windows are opened in the Android emulator by the user, the plurality of windows cannot be simultaneously recorded. In addition, when the user switches between the windows, content to be recorded is correspondingly switched to that in a newly displayed window. As a result, a requirement of the user for simultaneously recording the plurality of windows cannot be met.

SUMMARY

This application provides a multi-application screen recording method and an apparatus, to separately implement performing screen recording on a plurality of Android applications.

According to a first aspect, a multi-application screen recording method is provided. The method includes: receiving a first operation performed by a user in a window of a first application on an electronic device; in response to the first operation, performing, by the electronic device, screen recording on content of the window of the first application; receiving a second operation performed by the user in a window of a second application on the electronic device; in response to the second operation, performing, by the electronic device, screen recording on content of the window of the second application; and after performing screen recording on the content of the window of the second application for first duration, stopping, by the electronic device, performing screen recording on the content of the window of the first application. The first application and the second application are run in an Android system, and the window of the first application and the window of the second application are displayed in a non-Android system.

According to the method, a window of an Android application run in the Android system is displayed in the non-Android system (for example, Microsoft®, Windows, or Linux). The electronic device can start, based on an operation performed by the user in the window of the application, screen recording performed on content of a window of the Android application. The electronic device obtains, based on a window identity of the window of the Android application, a display identity that corresponds to the Android application and that is in the Android system, and obtains image data of the window of the Android application based on the display identity; and obtains, based on the window identity of the window of the Android application, an audio identity that corresponds to the Android application and that is in the Android system, and captures audio data of the Android application based on the audio identity. The electronic device can generate a screen recording file based on the image data and the audio data of the Android application, to complete screen recording. Because a screen recording channel of each Android application is independent, screen recording may be separately performed on a plurality of Android applications.

According to the first aspect, the electronic device includes a first screen recording file and a second screen recording file. The first screen recording file is generated by performing screen recording on the content of the window of the first application, and the second screen recording file is generated by performing screen recording on the content of the window of the second application.

According to the method, the screen recording channel of each Android application is independent. During screen recording, a screen recording file corresponding to each Android application is generated. Screen recording is performed on the plurality of Android applications simultaneously, and correspondingly, a plurality of screen recording files are generated.

According to any one of the first aspect or the foregoing implementations of the first aspect, the non-Android system includes the Windows system. The method further includes: creating, by the Android system, a first display corresponding to the window of the first application; creating a second display corresponding to the window of the second application; generating, by the Windows system, an interface of the first application based on image data of the first display; generating the first screen recording file based on the interface of the first application; further generating, by the Windows system, an interface of the second application based on image data of the second display; and generating the second screen recording file based on the interface of the second application.

According to the method, the Android system creates a display corresponding to a window of each application. Window data generated by each application is associated with one display (indicated by a display identity). During screen recording, image data of the display corresponding to the application is obtained based on the display identity, to implement image recording performed on the application.

According to any one of the first aspect or the foregoing implementations of the first aspect, the generating, by the Windows system, an interface of the first application based on image data of the first display includes: receiving, by the Windows system from the Android system, the image data of the first display and a first synthesis instruction of the image data of the first display; and obtaining, based on the first synthesis instruction, a first Windows synthesis instruction whose instruction format matches the Windows system, and performing synthesis and rendering on the image data of the first display by using the first Windows synthesis instruction, to generate the interface of the first application.

According to any one of the first aspect or the foregoing implementations of the first aspect, the generating, by the Windows system, an interface of the second application based on image data of the second display includes: receiving, by the Windows system from the Android system, the image data of the second display and a second synthesis instruction of the image data of the second display; and obtaining, based on the second synthesis instruction, a second Windows synthesis instruction whose instruction format matches the Windows system, and performing synthesis and rendering on the image data of the second display by using the second Windows synthesis instruction, to generate the interface of the second application.

According to the method, the Windows system generates the interface of the application based on the image data of the display corresponding to the application.

According to any one of the first aspect or the foregoing implementations of the first aspect, the method further includes: obtaining, by the Windows system, a first display identity based on an identity of the window of the first application, and obtaining the interface of the first application based on the first display identity; and obtaining, by the Windows system, a second display identity based on an identity of the window of the second application, and obtaining the interface of the second application based on the second display identity.

According to any one of the first aspect or the foregoing implementations of the first aspect, the method further includes: creating, by the Windows system, a first native window corresponding to the first display, and displaying the interface of the first application in the first native window; and creating, by the Windows system, a second native window corresponding to the second display, and displaying the interface of the second application in the second native window. In this way, the window of the first application and the window of the second application can be simultaneously displayed.

According to any one of the first aspect or the foregoing implementations of the first aspect, if the first application is switched to a background for running, in response to switching the first application to the background for running, the Windows system stops obtaining the interface of the first application based on the first display identity. To be specific, the first application is stopped from being displayed, and image recording performed on the first application is stopped. The Android system stops generating the image data of the first display, and stops sending the image data of the first display to the Windows system.

According to any one of the first aspect or the foregoing implementations of the first aspect, the non-Android system includes the Windows system. The method further includes: creating, by the Android system, a first audio track instance corresponding to the window of the first application, and creating a second audio track instance corresponding to the window of the second application; obtaining, by the Windows system, a first audio identity based on the identity of the window of the first application, where the first audio identity indicates the first audio track instance; obtaining, by the Windows system, data of the first audio track instance based on the first audio identity, and generating the first screen recording file based on the data of the first audio track instance; obtaining, by the Windows system, a second audio identity based on the identity of the window of the second application window, where the second audio identity indicates the second audio instance; and obtaining, by the Windows system, data of the second audio track instance based on the second audio identity, and generating the second screen recording file based on the data of the second audio track instance.

According to the method, the Android system generates an audio track instance (indicated by an audio identity) corresponding to the window of each application, and during screen recording, obtains data of the audio track instance corresponding to the application based on the audio identity, to implement audio recording performed on this application.

According to any one of the first aspect or the foregoing implementations of the first aspect, if the first application is switched to the background for running, in response to switching the first application to the background for running, the Android system stops generating the data of the first audio track instance; and the Windows system stops obtaining the data of the first audio track instance based on the first audio identity, and stops generating the first screen recording file based on the data of the first audio track instance. In this way, audio recording can be stopped when the application is switched to the background for running.

According to any one of the first aspect or the foregoing implementations of the first aspect, the performing, by the electronic device, screen recording on content of the window of the first application includes: recording, by the electronic device, an image of the window of the first application; recording, by the electronic device, an audio of the first application; or recording, by the electronic device, an image and an audio of the window of the first application.

According to the method, the electronic device can obtain, based on the window identity of the window of the Android application, the display identity that corresponds to the Android application and that is in the Android system, capture the image data of the window of the Android application based on the display identity, and generate an image file based on the image data, to complete image recording performed on the content displayed in the window of the Android application. The electronic device can obtain, based on the window identity of the window of the Android application, the audio identity that corresponds to the Android application and that is in the Android system, capture the audio data of the Android application based on the audio identity, and generate an audio file based on the audio data, to complete audio recording performed on the window of the Android application. The electronic device can generate a video file based on the image data and the audio data of the Android application, to complete video recording performed on the window of the Android application. To be specific, the electronic device can record only an image of the Android application, record only an audio of the Android application, or record an image and an audio of the Android application.

According to any one of the first aspect or the foregoing implementations of the first aspect, the performing, by the electronic device, screen recording on content of the window of the second application includes: recording, by the electronic device, an image of the window of the second application.

According to the method, the electronic device can separately record the image of the window of the first application and the image of the window of second application simultaneously; record the image of the window of the second application when recording an audio of the window of the first application (or may further combine an audio of the window of the first application and the image of the window of the second application into a new video file); or record the image of the window of the second application when recording a video of the window of the first application.

In an implementation, the electronic device may further receive an input from a microphone, and combine the recorded image of the window of the Android application and a voice input from the microphone into a video file, to implement underscoring, dubbing, and the like for the image of the Android application. This improves use enjoyment of the user.

According to any one of the first aspect or the foregoing implementations of the first aspect, the performing, by the electronic device, screen recording on content of the window of the second application includes: recording, by the electronic device, an audio of the second application.

According to the method, the electronic device may record the audio of the second application when recording the image of the window of the first application (or may further combine the image of the window of the first application and the audio of the second application into a new video file); separately record the audio of the first application and the audio of the second application simultaneously; or record the audio of the second application when recording the video of the window of the first application.

According to any one of the first aspect or the foregoing implementations of the first aspect, the performing, by the electronic device, screen recording on content of the window of the second application includes: recording, by the electronic device, the image and the audio of the window of the second application.

According to the method, the electronic device can record the video of the second application when recording the image of the window of the first application; separately record the video of the first application and the video of the second application simultaneously; or recording the video of the second application when recording the audio of the window of the first application.

According to any one of the first aspect or the foregoing implementations of the first aspect, the method further includes: displaying, by the electronic device, the window of the first application and the window of the second application.

In this way, the electronic device simultaneously displays the window of the first application and the window of the second application, to display windows of the plurality of Android applications.

According to a second aspect, an electronic device is provided. The electronic device includes a processor, a memory, a display screen, and a computer program. The computer program is stored in the memory. When the computer program is executed by the processor, the electronic device is enabled to perform the following steps: receiving a first operation performed by a user in a window of a first application on the electronic device; in response to the first operation, performing, by the electronic device, screen recording on content of the window of the first application; receiving a second operation performed by the user in a window of a second application on the electronic device; in response to the second operation, performing, by the electronic device, screen recording on content of the window of the second application; and after performing screen recording on the content of the window of the second application for first duration, stopping, by the electronic device, screen recording on the content of the window of the first application. The first application and the second application are run in an Android system, and the window of the first application and the window of the second application are displayed in a non-Android system.

According to the second aspect, the electronic device includes a first screen recording file and a second screen recording file. The first screen recording file is generated by performing screen recording on the content of the window of the first application, and the second screen recording file is generated by performing screen recording on the content of the window of the second application.

According to any one of the second aspect or the foregoing implementations of the second aspect, the performing, by the electronic device, screen recording on content of the window of the first application includes: recording, by the electronic device, an image of the window of the first application; recording, by the electronic device, an audio of the first application; or recording, by the electronic device, an image and an audio of the window of the first application.

According to any one of the second aspect or the foregoing implementations of the second aspect, the performing, by the electronic device, screen recording on content of the window of the second application includes: recording, by the electronic device, an image of the window of the second application.

According to any one of the second aspect or the foregoing implementations of the second aspect, the performing, by the electronic device, screen recording on content of the window of the second application includes: recording, by the electronic device, an audio of the second application.

According to any one of the second aspect or the foregoing implementations of the second aspect, the performing, by the electronic device, screen recording on content of the window of the second application includes: recording, by the electronic device, the image and the audio of the window of the second application.

According to any one of the second aspect or the foregoing implementations of the second aspect, when the computer program is executed by the processor, the electronic device is further enabled to perform the following steps: displaying, by the electronic device, the window of the first application and the window of the second application.

For technical effects corresponding to any one of the second aspect and the implementations of the second aspect, refer to technical effects corresponding to any one of the first aspect and the implementations of the first aspect. Details are not described herein again.

According to a third aspect, a computer-readable storage medium is provided. The computer-readable storage medium stores a computer program (which may also be referred to as instructions or code). When the computer program is executed by an electronic device, the electronic device is enabled to perform the method according to any one of the first aspect or the implementations of the first aspect.

For technical effects corresponding to any one of the third aspect and the implementations of the third aspect, refer to technical effects corresponding to any one of the first aspect and the implementations of the first aspect. Details are not described herein again.

According to a fourth aspect, a computer program product is provided. When the computer program product runs on an electronic device, the electronic device is enabled to perform the method according to any one of the first aspect or the implementations of the first aspect.

For technical effects corresponding to any one of the fourth aspect and the implementations of the fourth aspect, refer to technical effects corresponding to any one of the first aspect and the implementations of the first aspect. Details are not described herein again.

According to a fifth aspect, a chip system is provided. The chip system includes a processor and an interface circuit. The interface circuit is configured to: perform a transceiver function, and send instructions to the processor. When the instructions are executed by the processor, the processor is enabled to perform the method according to any one of the first aspect or the implementations of the first aspect.

For technical effects corresponding to any one of the fifth aspect and the implementations of the fifth aspect, refer to technical effects corresponding to any one of the first aspect and the implementations of the first aspect. Details are not described herein again.

BRIEF DESCRIPTION OF THE DRAWINGS

FIG. 4C-1 to FIG. 4C-3 are a schematic diagram of a scenario instance of a multi-application screen recording method according to this application;

DETAILED DESCRIPTION OF ILLUSTRATIVE EMBODIMENTS

Figure 1A:
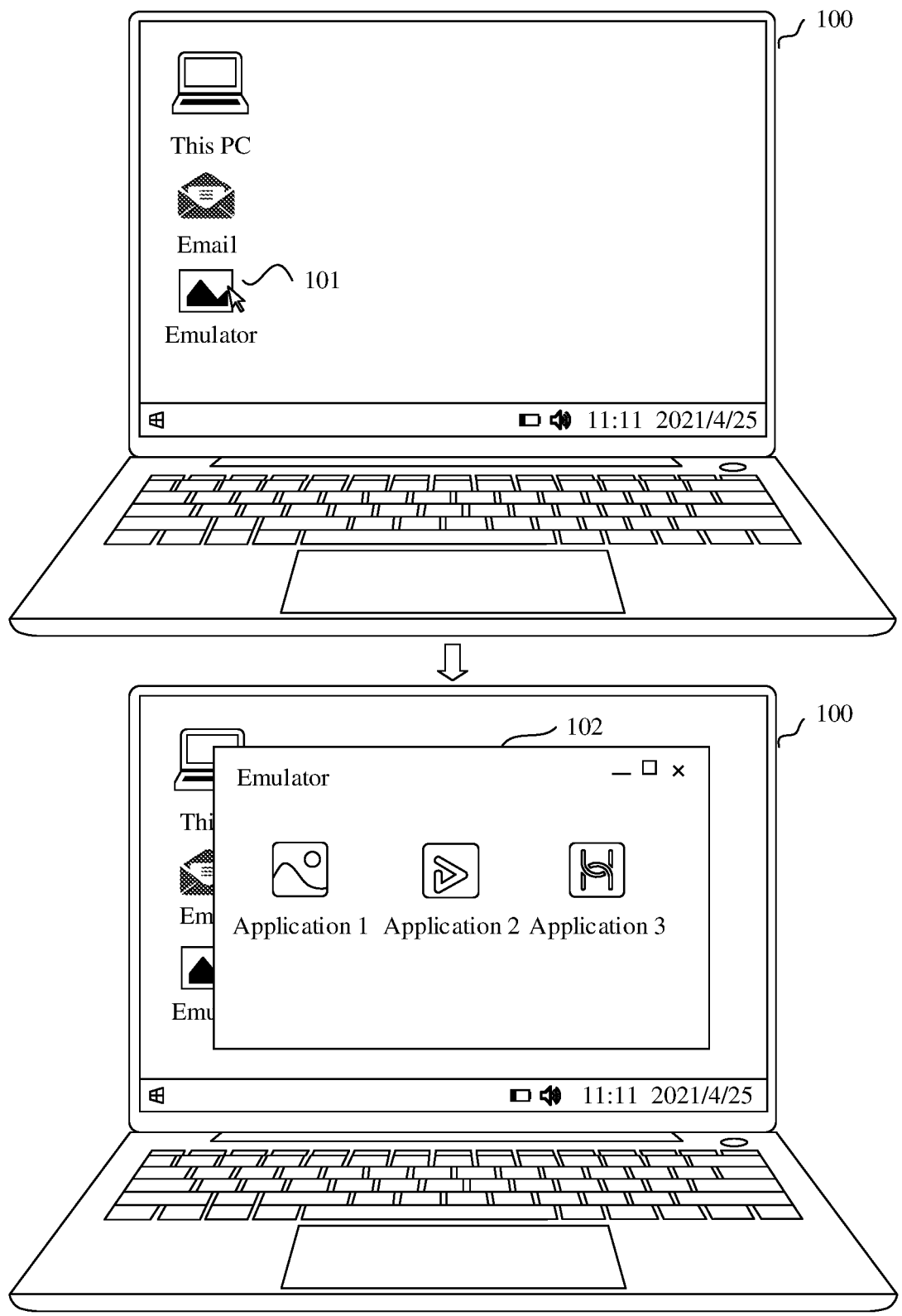
FIG. 1A is a schematic diagram of an operating scenario instance of an Android emulator.

Terms used in the following embodiments are merely intended to describe specific embodiments, but are not intended to limit this application. The terms "one", "a", "the", "the foregoing", "this", and "the one" of singular forms used in this specification and the appended claims of this application are also intended to include forms such as "one or more", unless otherwise specified in the context clearly. It should be further understood that, in the following embodiments of this application, "at least one" and "one or more" mean one or more than two (including two). The term "and/or" is for describing an association relationship between associated objects and indicates that three relationships may exist. For example, A and/or B may indicate the following cases: Only A exists, both A and B exist, and only B exists, where A and B each may be singular or plural. The character "/" generally indicates an "or" relationship between associated objects.

Reference to "an embodiment", "some embodiments", or the like described in this specification indicates that one or more embodiments of this application include a specific feature, structure, or characteristic described with reference to the embodiment. Therefore, statements such as "in an embodiment", "in some embodiments", "in some other embodiments", and "in other embodiments" that appear at different places in this specification do not necessarily mean reference to a same embodiment. Instead, the statements mean "one or more but not all of embodiments", unless otherwise specifically emphasized in another manner. The terms "include", "comprise", "have", and their variants all mean "include but are not limited to", unless otherwise specifically emphasized in another manner. The term "connection" includes a direct connection and an indirect connection, unless otherwise stated.

In the following descriptions, the terms "first" and "second" are merely intended for a purpose of description, and shall not be interpreted as indicating or implying relative importance or implying a quantity of indicated technical features. Therefore, a feature defined with "first" or "second" may explicitly or implicitly include one or more features.

In embodiments of this application, the word "example" or "for example" is for representing giving an example, an illustration, or a description. Any embodiment or design described as an "example" or "for example" in embodiments of this application should not be construed as being more preferred or advantageous than another embodiment or design. To be precise, the word like "example" or "for example" is intended to present a related concept in a specific manner.

An Android emulator can emulate an Android operating system in a non-Android system. A user may install, run, or uninstall an Android application in the Android operating system. For example, a computer 100 carries a non-Android operating system, for example, Windows or Linux. The Android emulator is installed in the operating system of the computer 100. The user may run the Android emulator on the computer 100, to install, run, or uninstall the Android application on the computer 100.

In an example, as shown in FIG. 1A, a desktop of the computer 100 includes an "Emulator" icon 101. The user may use an input device (for example, a mouse) of the computer 100 to click the "Emulator" icon 101 to run the Android emulator. In response to the click operation performed by the user on the "Emulator" icon 101, the computer 100 displays a main interface 102 of the Android emulator. The main interface 102 of the Android emulator includes an "Application 1" icon, an "Application 2" icon, and an "Application 3" icon. The user may click the "Application 1" icon to start an Android application 1, click the "Application 2" icon to start an Android application 2, and click the "Application 3" icon to start an Android application 3.

Figure 1B:
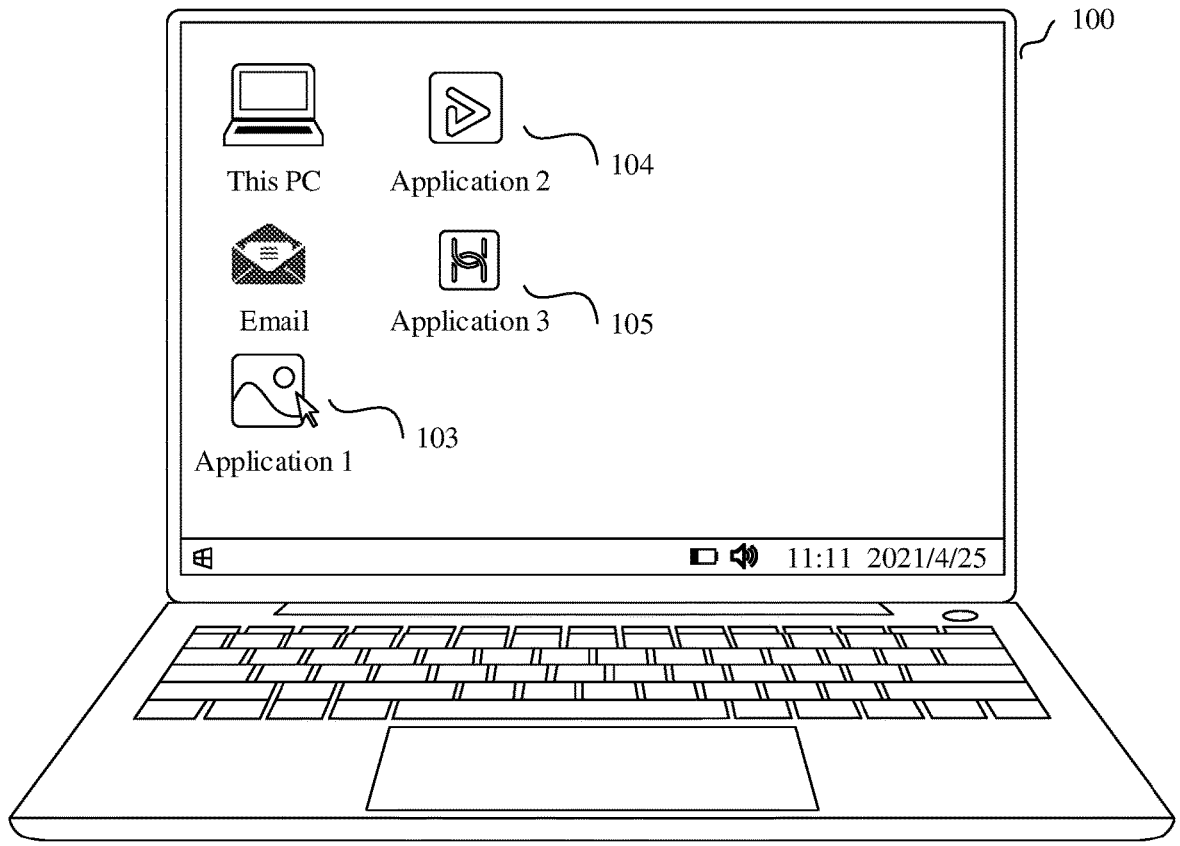
FIG. 1B is a schematic diagram of an operating scenario instance of an Android emulator.

In another example, as shown in FIG. 1B, a desktop of the computer 100 includes an "Application 1" icon 103, an "Application 2" icon 104, and an "Application 3" icon 105. The user may click the "Application 1" icon 103 to start an Android application 1, click the "Application 2" icon 104 to start an Android application 2, and click the "Application 3" icon 105 to start an Android application 3.

Figure 2:
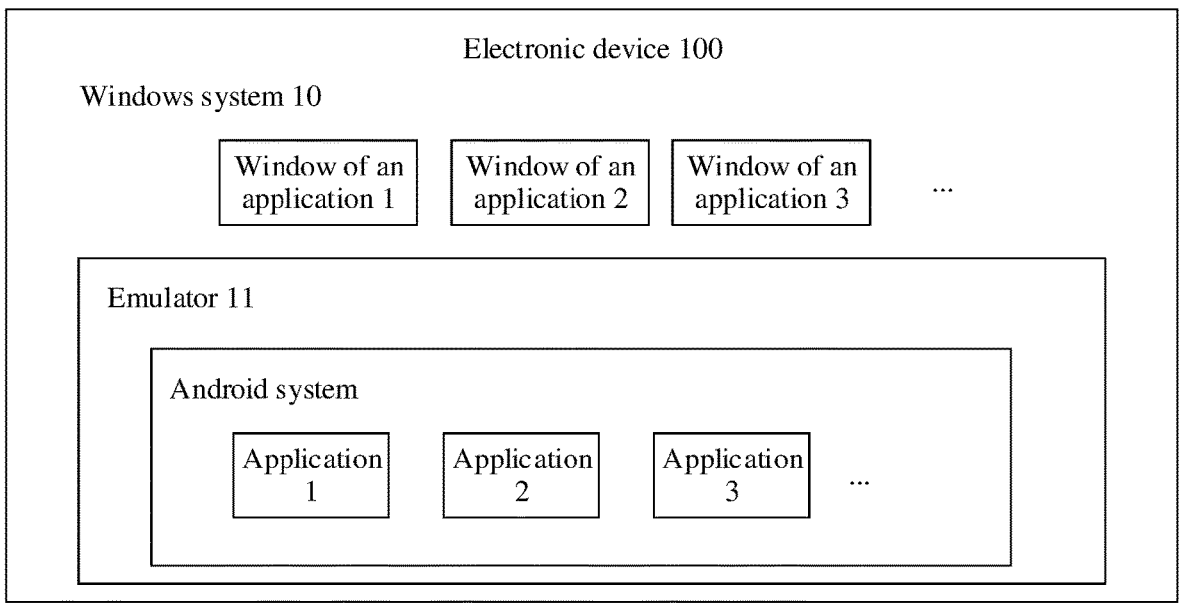
FIG. 2 is a schematic diagram of an architecture for running an Android emulator on an electronic device.

For example, FIG. 2 is a schematic diagram of an architecture for running an Android emulator is run on an electronic device. As shown in FIG. 2, in an example embodiment, the electronic device 100 includes but is not limited to a portable device (for example, a notebook computer), a fixed device (for example, a PC), a server, or the like that carries Microsoft®, Windows, Linux, or another operating system. In FIG. 2, the electronic device 100 that carries the Windows system is used as an example. The Windows system 10 supports installation and running of a plurality of applications. An emulator 11 is an application that emulates an Android operating system, and supports installation and running of an Android application (for example, a video application, a music application, a smart home application, or a mobile game), to implement running of the Android application on the electronic device 100. For example, as shown in FIG. 2, Android applications such as an application 1, an application 2, and an application 3 are installed in the Android system. A user may start the application 1, the application 2, or the application 3, so that the application 1, the application 2, or the application 3 is run in the Android system. When the application 1, the application 2, or the application 3 is run, a window of the application 1, a window of the application 2, or a window of the application 3 is generated. The Windows system 10 manages the window of the application 1, the window of the application 2, and the window of the application 3. In some embodiments, the Windows system 10 receives an operation performed by the user on a user interface (user interface, UI) in the window of the application 1, the window of the application 2, or the window of the application 3, generates an instruction corresponding to the user operation, and sends the instruction to a corresponding Android application run in the Android system for processing.

In an example, the user may perform screen recording on the Android application. Screen recording is to record content (for example, an image or an audio) of a window of the Android application as a screen recording file (for example, an image file, an audio file, or a video file).

Figure 3A:
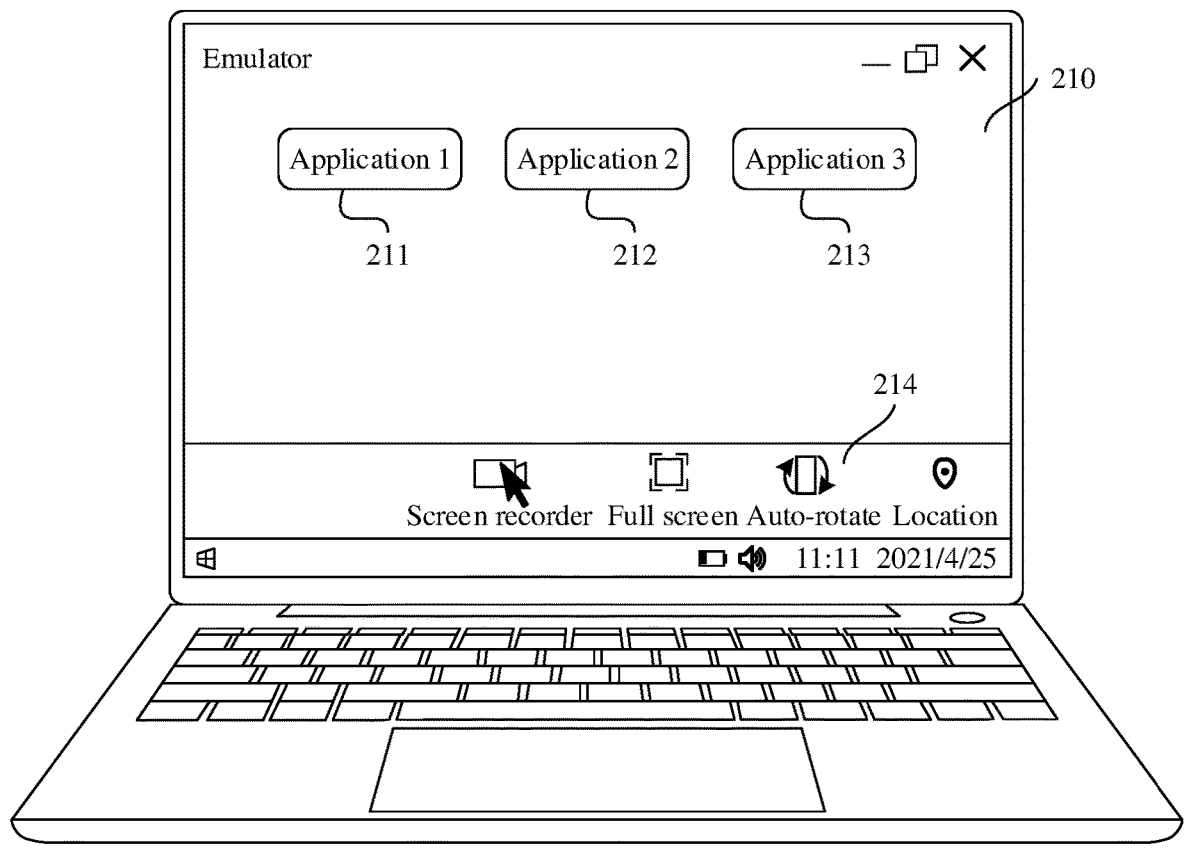
FIG. 3(a) to FIG. 3(d) are a schematic diagram of a scenario instance of a screen recording method in an Android emulator.
Figure 3B:
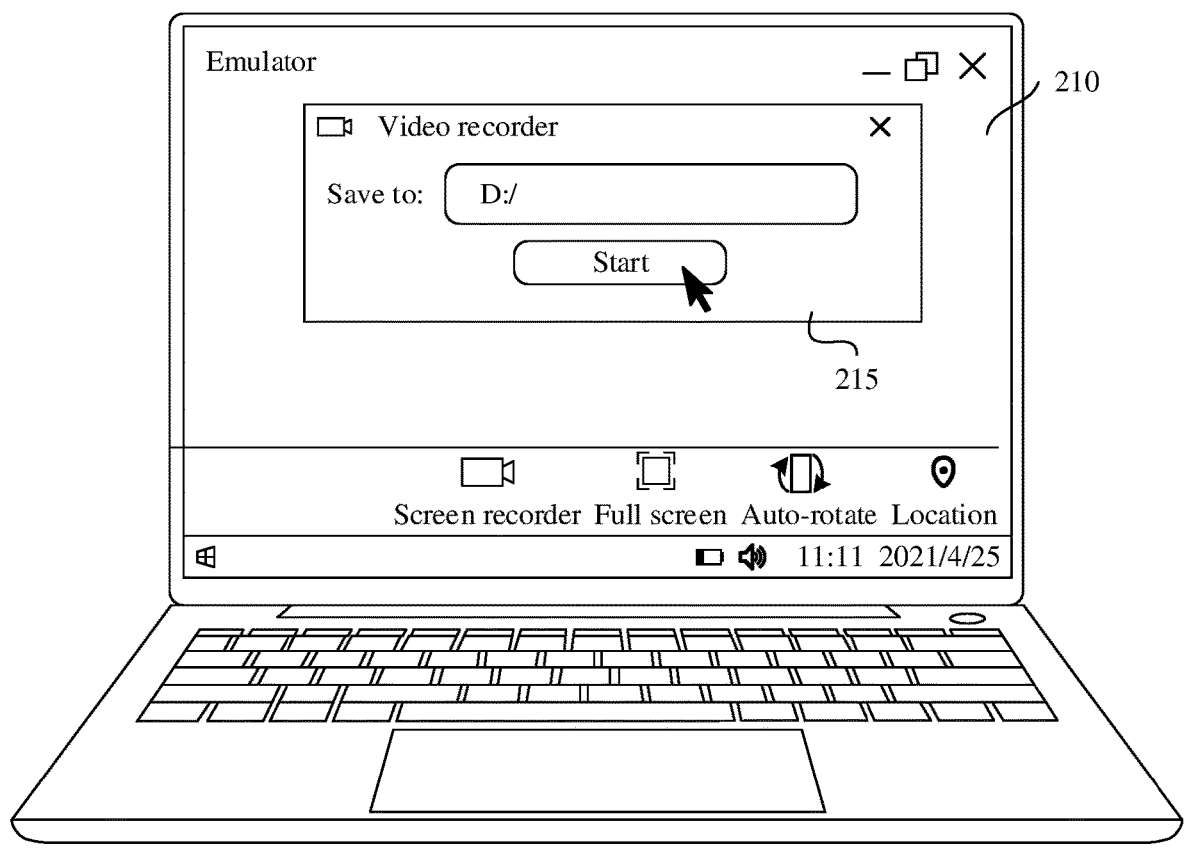
Figure 3C:
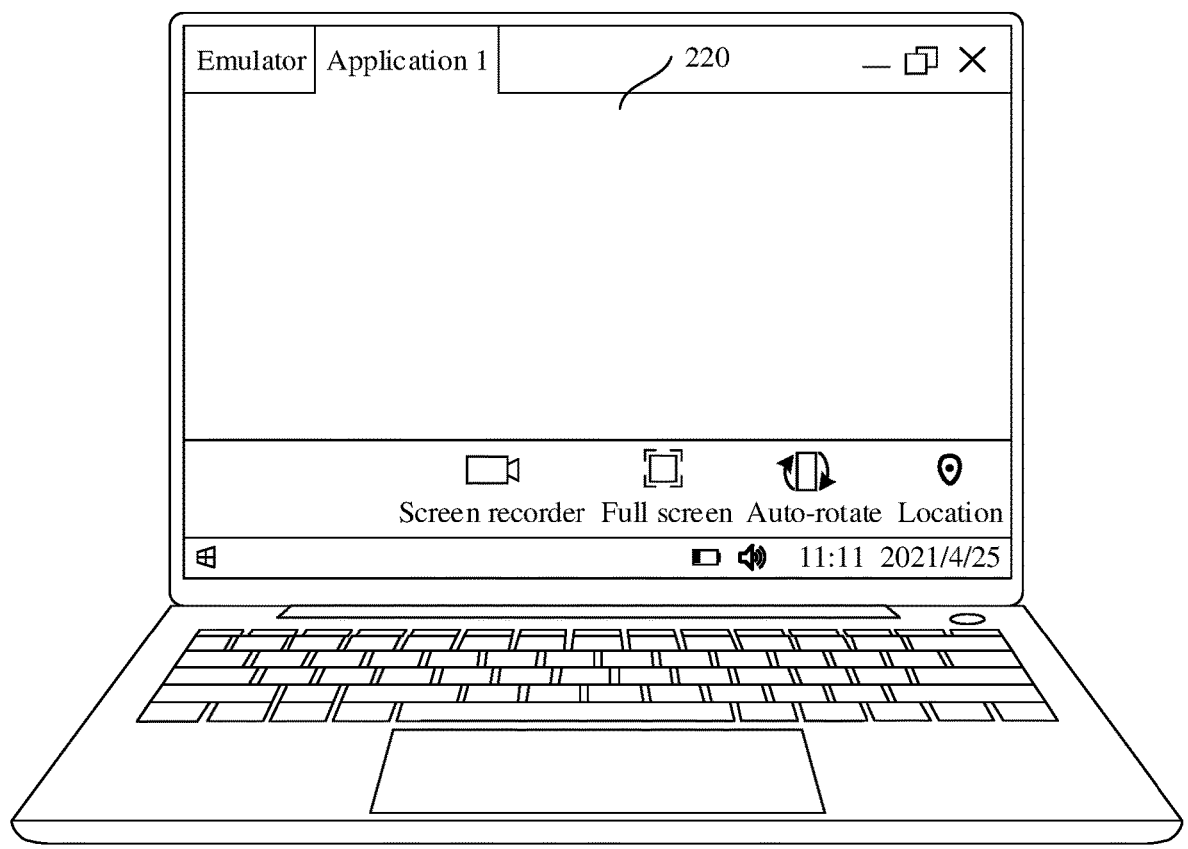
Figure 3D:
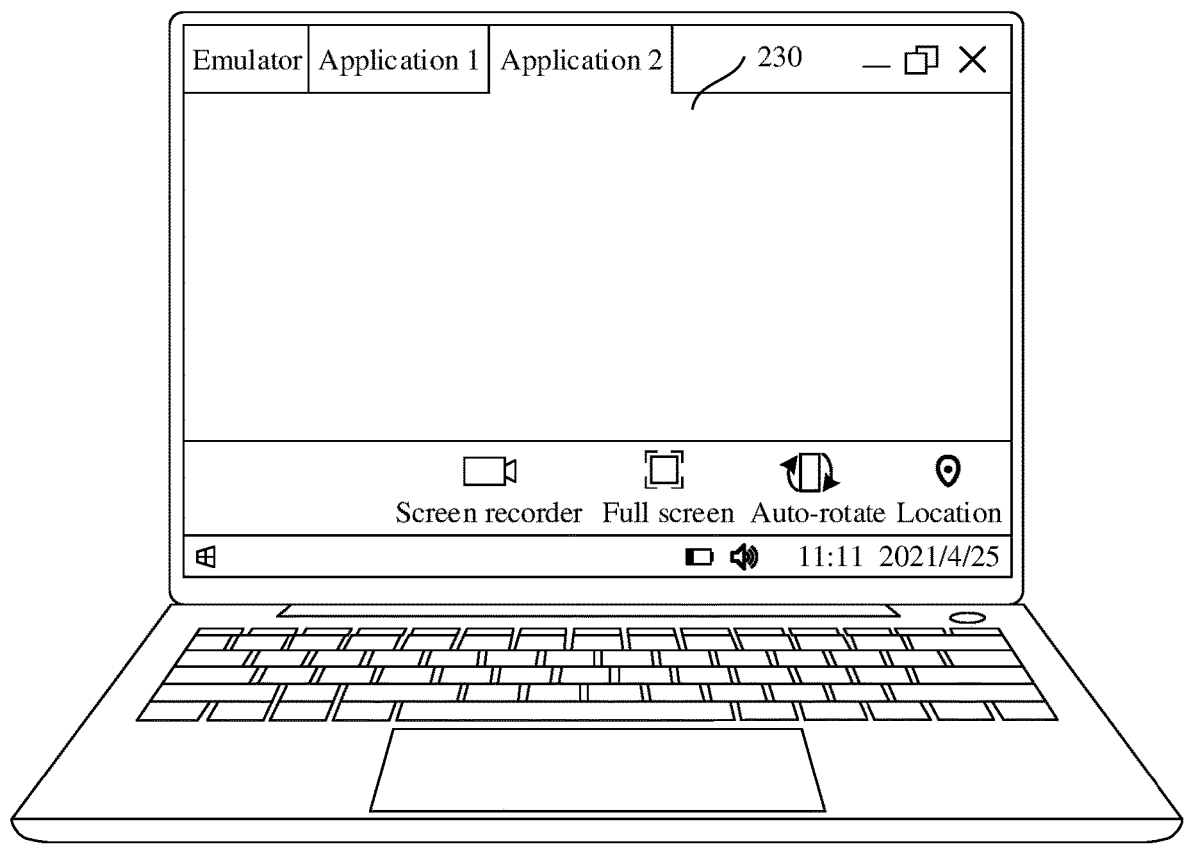

In an example, FIG. 3(a) to FIG. 3(d) show a scenario instance of a screen recording method in an Android emulator. As shown in FIG. 3(a), a main interface 210 of the Android emulator includes an "Application 1" icon 211, an "Application 2" icon 212, and an "Application 3" icon 213. A user may use an input device of a computer 100 to click the "Application 1" icon 211 to start an application 1, click the "Application 2" icon 212 to start an application 2, and click the "Application 3" icon 213 to start an application 3. The main interface 210 of the Android emulator further includes a function bar 214. The function bar 214 includes a "Screen recorder" button, a "Full screen" button, an "Auto-rotate" button, a "Location" button, and the like. The "Screen recorder" button is for enabling a screen recording function. The "Full screen" button is for displaying a window in full screen on a screen of the computer 100. The "Auto-rotate" button is for rotating a display direction of the window. The "Location" button is for determining a location of the device. For example, in response to a click operation performed by the user on the "Screen recorder" button, as shown in FIG. 3(b), a "Video recording" page 215 is displayed on the main interface 210 of the Android emulator. The "Video recording" page 215 includes an input box that is for entering a storage address for a screen recording file. The "Video recording" user on the "Start" button, the computer 100 starts to perform video recording. In an implementation, a picture recorded by the computer 100 is content displayed in a current focus window in a window of the Android emulator. When the focus window changes, content to be recorded changes accordingly. For example, as shown in FIG. 3(c), the user starts the application 1, and an interface 220 of the application 1 is displayed in the window of the Android emulator. The content to be recorded is content displayed on the interface 220. As shown in FIG. 3(d), the user starts the application 2, and an interface 230 of the application 2 is displayed in the window of Android emulator. The content to be recorded changes to content displayed on the interface 230. A requirement of the user for simultaneously recording a plurality of windows in the Android emulator cannot be met.

Figure 4A:
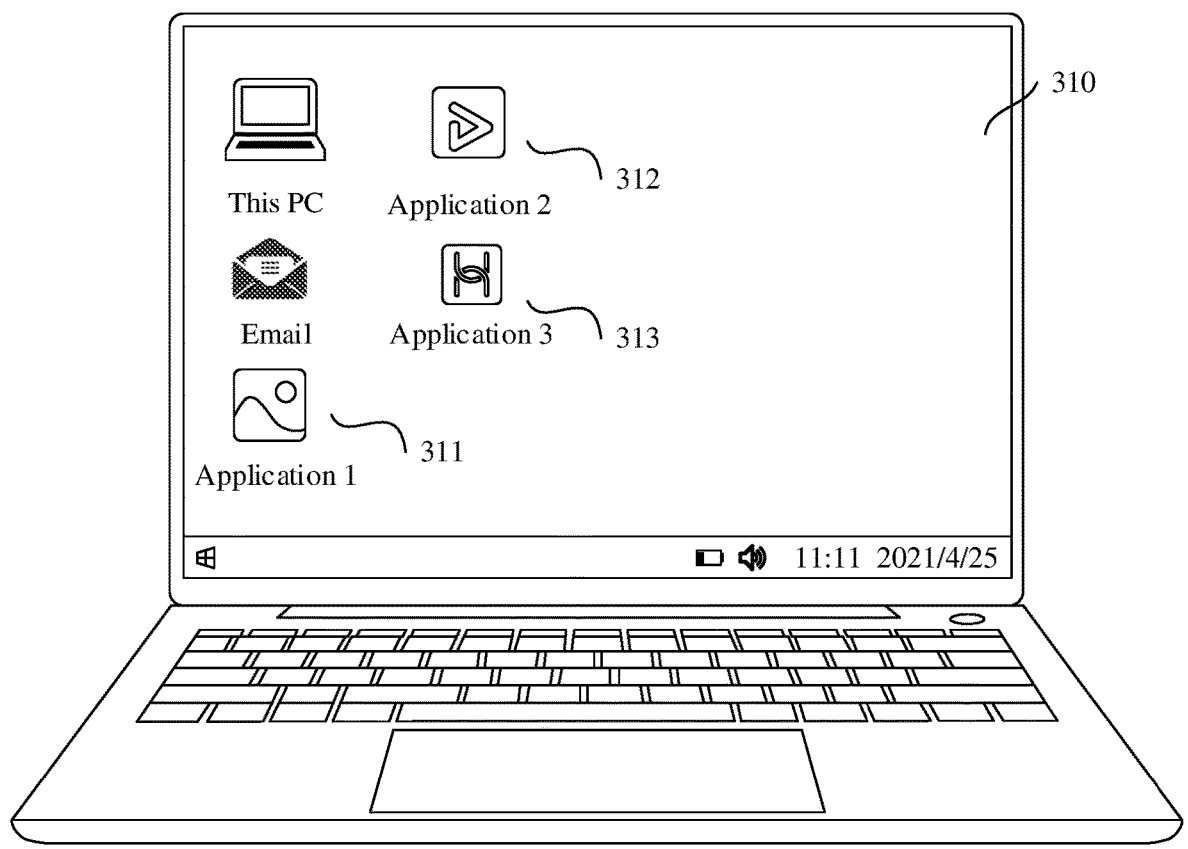
FIG. 4A(a) to FIG. 4A(f) are a schematic diagram of a scenario instance of a multi-application screen recording method according to this application.
Figure 4A:
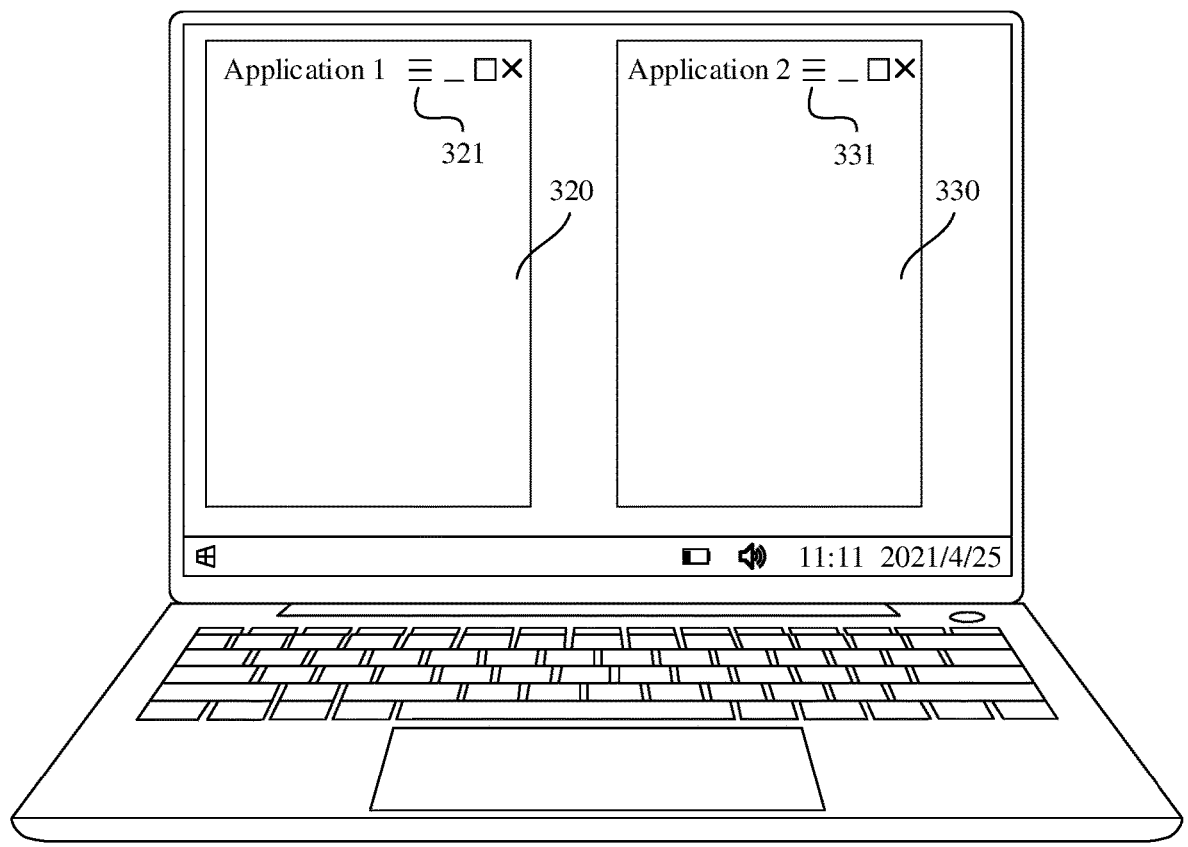
Figure 4A:
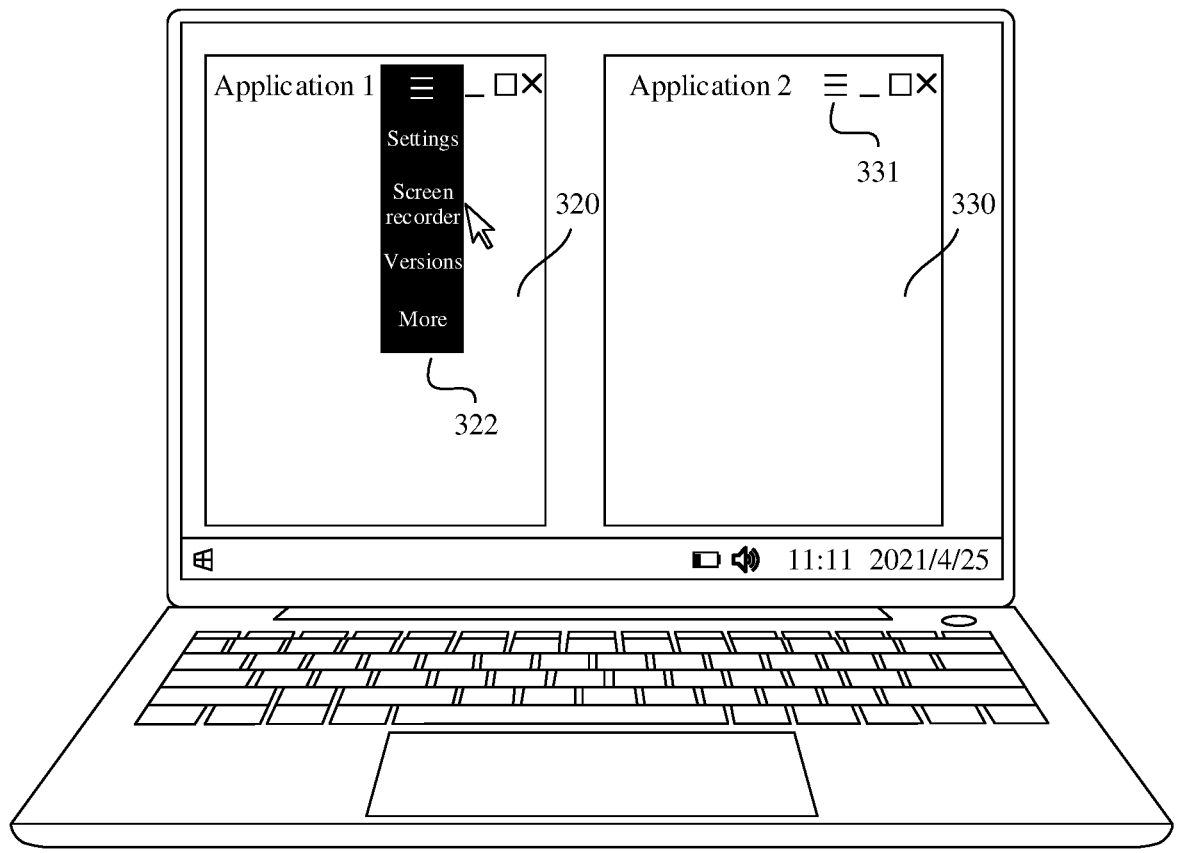
Figure 4A:
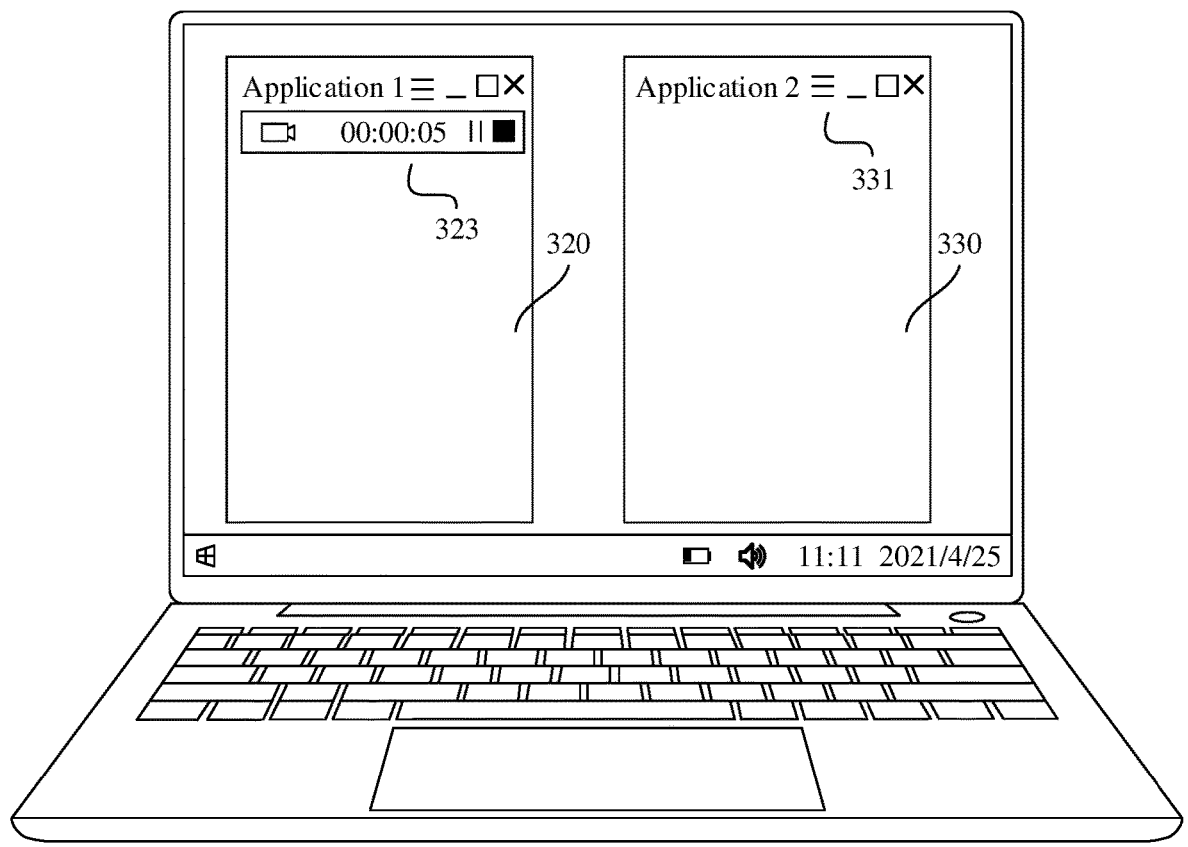
Figure 4A:
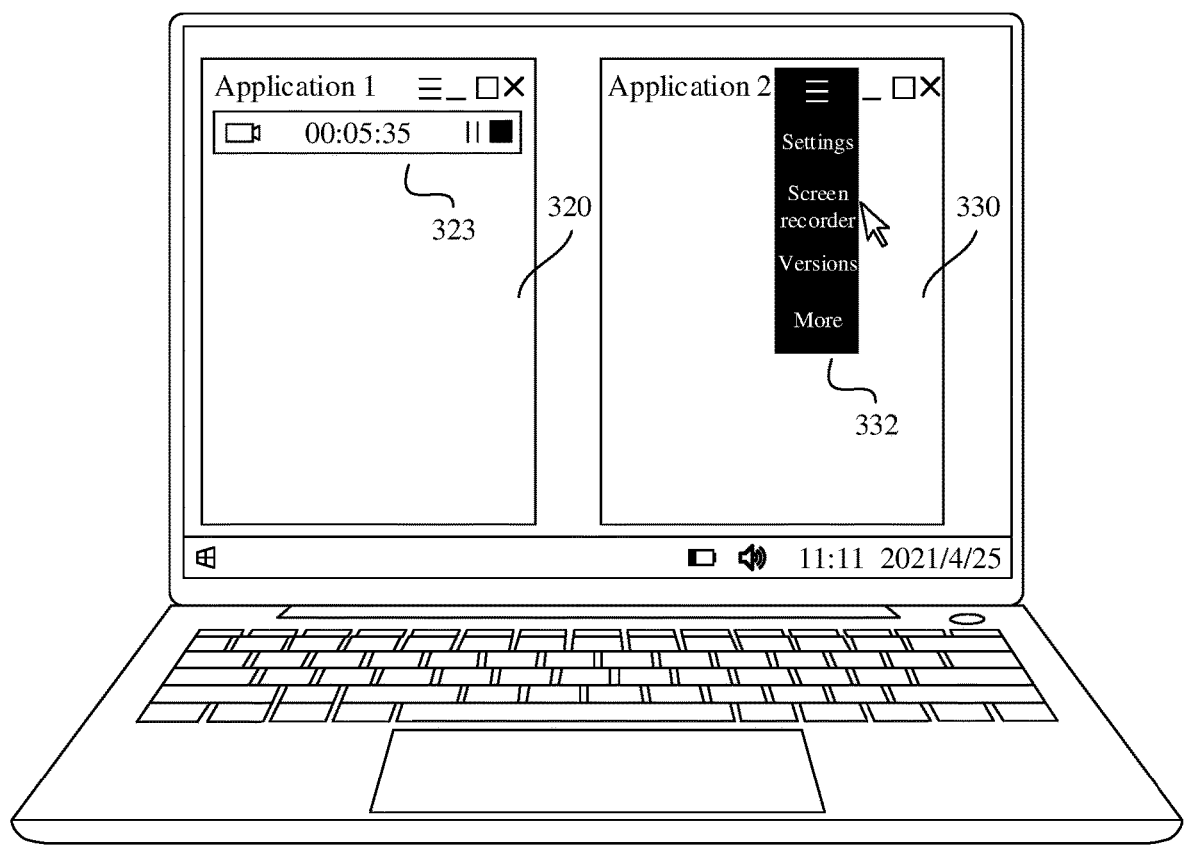
Figure 4A:
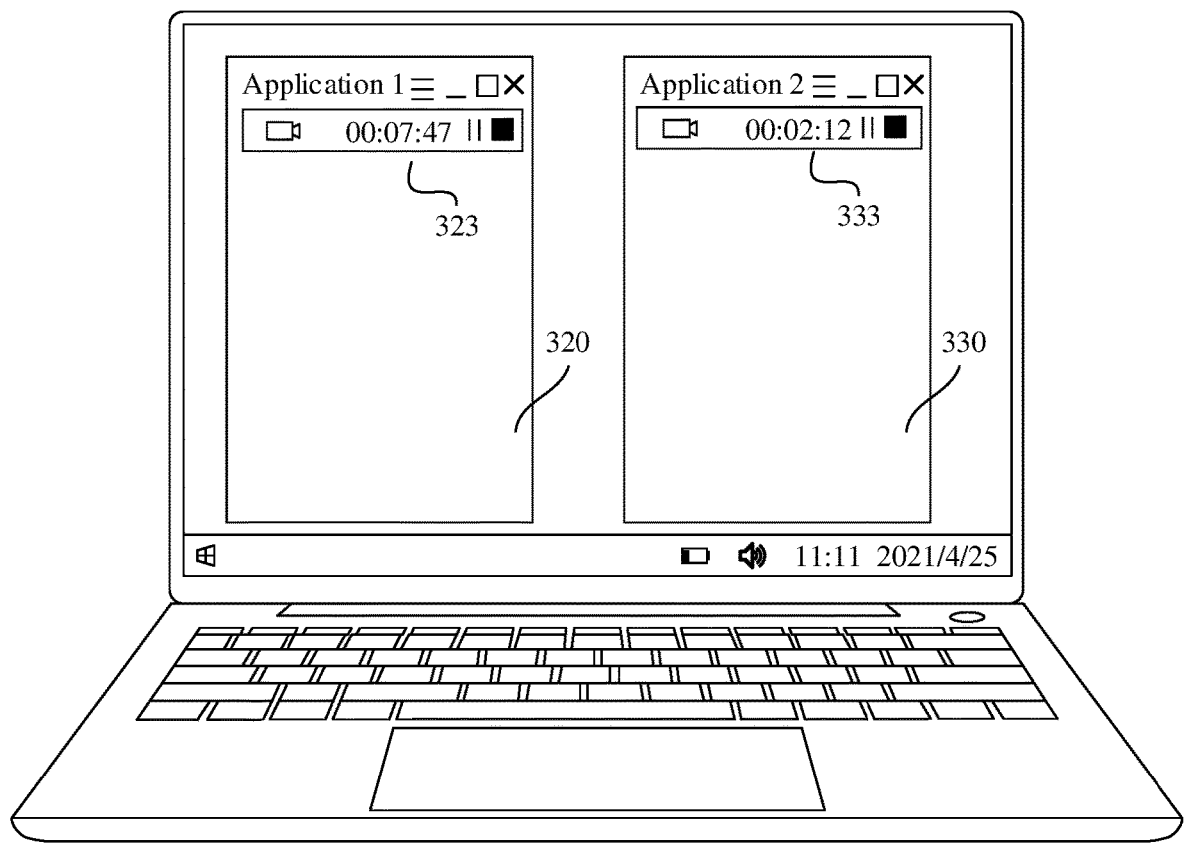

Embodiments of this application provide a multi-application screen recording method, to separately perform screen recording on a plurality of Android applications. FIG. 4A(a) to FIG. 4A(f) show a scenario instance of a screen recording method in an Android emulator according to an embodiment of this application. For example, as shown in FIG. 4A(a), a desktop 310 of a computer 100 includes an "Application 1" icon 311, an "Application 2" icon 312, and an "Application 3" icon 313. A user may use an input device of the computer 100 to click the "Application 1" icon 311 to start an application 1, click the "Application 2" icon 312 to start an application 2, and click the "Application 3" icon 313 to start an application 3. For example, in response to a click operation performed by the user on the "Application 1" icon 311, as shown in FIG. 4A(b), the computer 100 displays an interface 320 of the application 1. In response to a click operation performed by the user on the "Application 2" icon 312, the computer 100 displays an interface 330 of the application 2. For example, as shown in FIG. 4A(b), both windows carried by the interface 320 of the application 1 and the interface 330 of the application 2 are windows on a Windows side, and content displayed in the windows is content generated when the Android applications are run in the emulator. The interface 320 of the application 1 includes a "menu" 321, and the interface 330 of the application 2 includes a "menu" 331. In an example, the user starts video recording performed on the application 1. As shown in FIG. 4A(c), in response to a click operation performed by the user on the "menu" 321, a drop-down menu 322 is displayed on the interface 320. The drop-down menu 322 includes a "screen recorder" option. The user may use the input device of the computer 100 to click the "screen recorder" option in the drop-down menu 322, to start video recording performed on the application 1. In response to the click operation performed by the user on the "screen recorder" option in the drop-down menu 322, the computer 100 starts to record content of the window of the application 1. For example, as shown in FIG. 4A(d), a "video recording" toolbar 323 is displayed on the interface 320 of the application 1. The "video recording" toolbar 323 includes recording duration, a pause/continue button, an end button, and the like. The user may pause or continue, by clicking the pause/continue button, screen recording performed on the application 1, and may stop, by clicking the end button, screen recording performed on the application 1.

During screen recording performed on the application 1, the user may also start video recording performed on the application 2. For example, in response to a click operation performed by the user on the "menu" 331, as shown in FIG. 4A(e), a drop-down menu 332 is displayed on the interface 330. The drop-down menu 332 includes a "screen recorder" option. The user may use the input device of the computer 100 to click the "screen recorder" option in the drop-down menu 332, to start video recording performed on the application 2. In response to the click operation performed by the user on the "screen recorder" option in the drop-down menu 332, the computer 100 starts to record content of the window of the application 2. As shown in FIG. 4A(f), a "video recording" toolbar 333 is displayed on the interface 330 of the application 2. The "video recording" toolbar 323 includes recording duration, a pause/continue button, an end button, and the like. The user may pause or continue, by clicking the pause/continue button, screen recording performed on the application 2, and may stop, by clicking the end button, screen recording performed on the application 2. For example, the computer 100 separately performs screen recording on the application 1 and the application 2. After a period of time, the user clicks the end button on the "video recording" toolbar 323 of the application 1, to stop screen recording performed on the application 1. It should be noted that an example in which the computer 100 displays the "video recording" toolbar 323 and the "video recording" toolbar 333 is used in FIG. 4A(a) to FIG. 4A(f). In some other examples, when the computer 100 performs screen recording on an application, a "video recording" toolbar may not be displayed.

Figures 1, 4B:
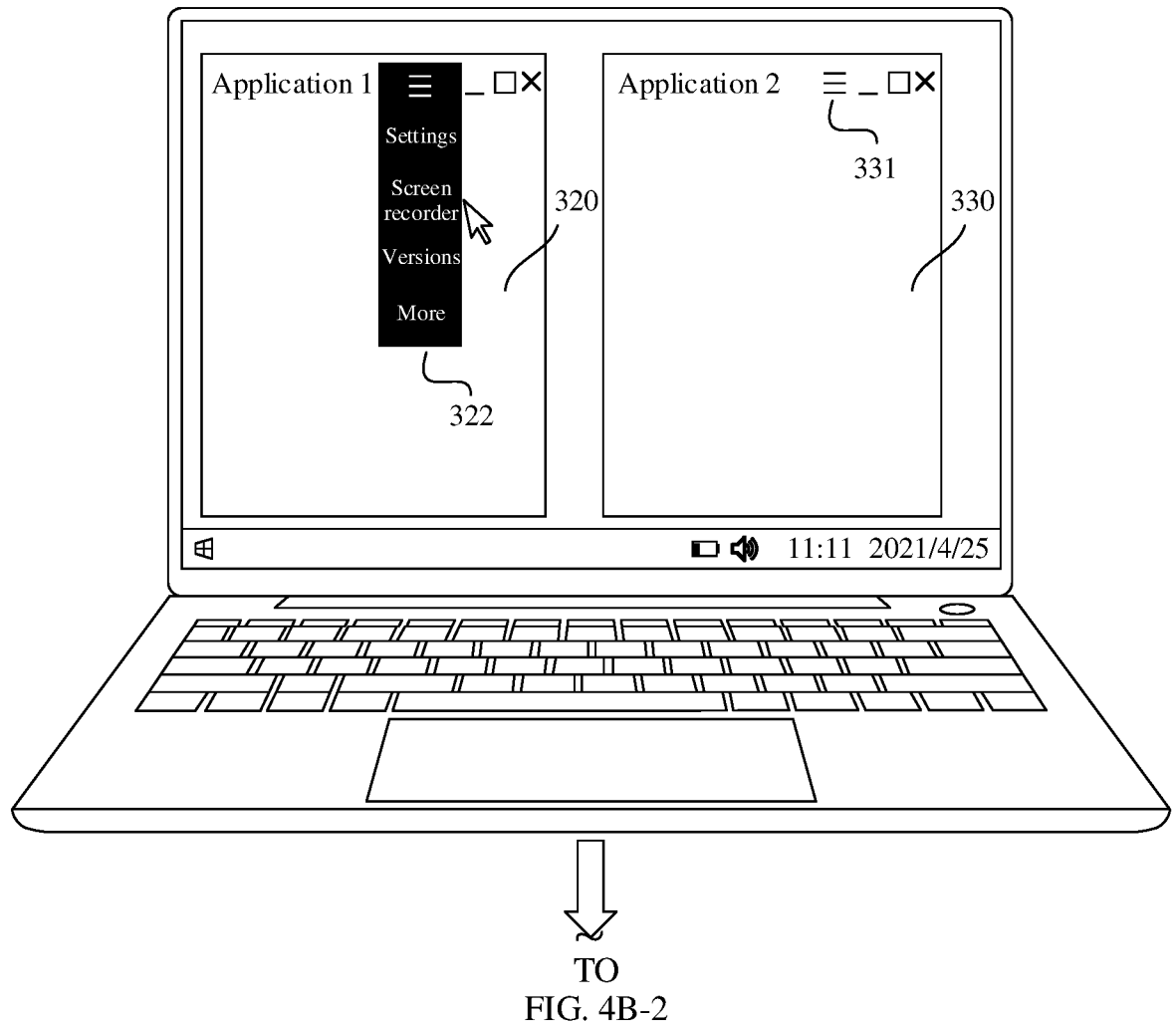
FIG. 4B-1 to FIG. 4B-3 are a schematic diagram of a scenario instance of a multi-application screen recording method according to this application.
Figures 2, 4B:
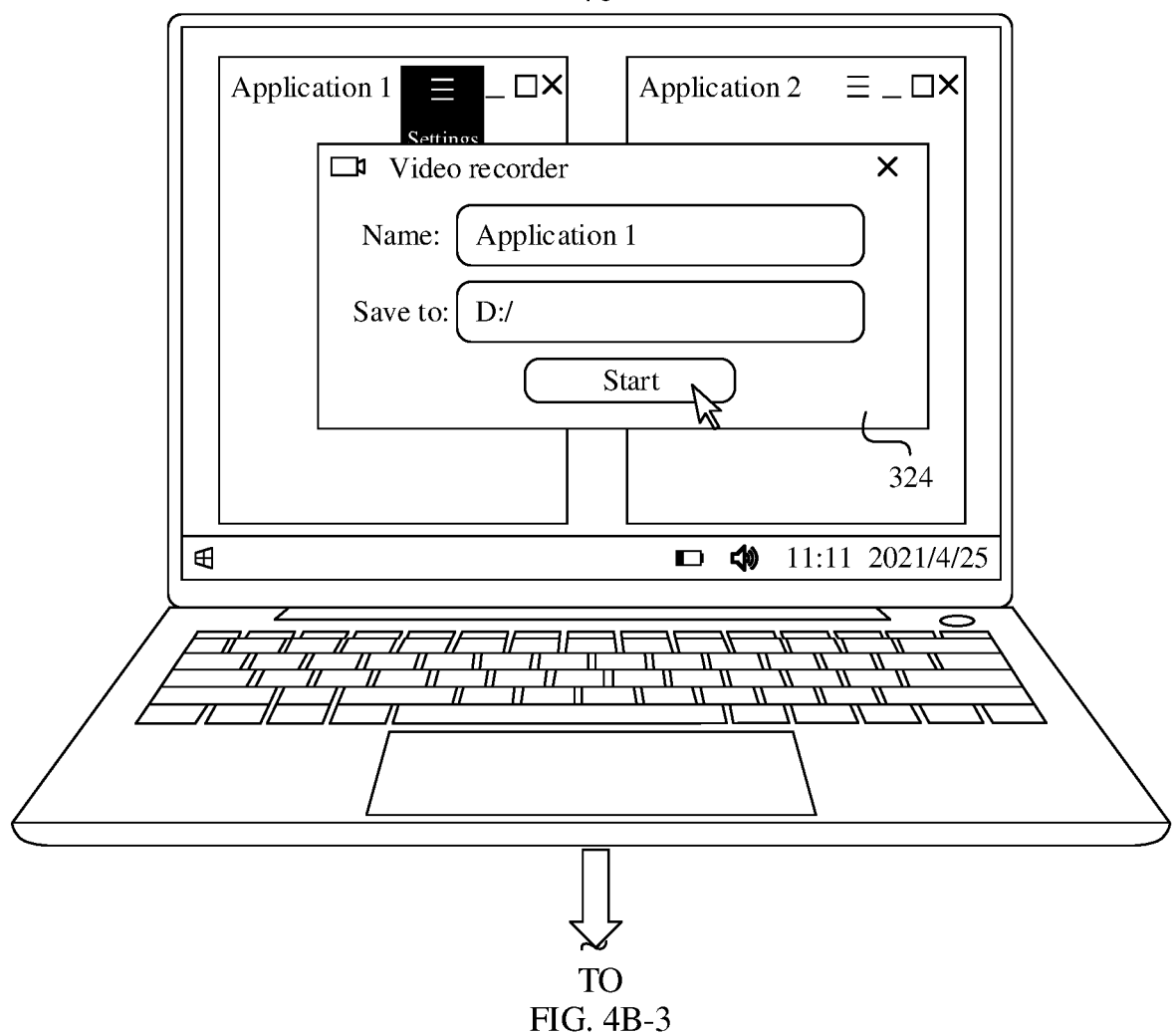
Figures 3, 4B:
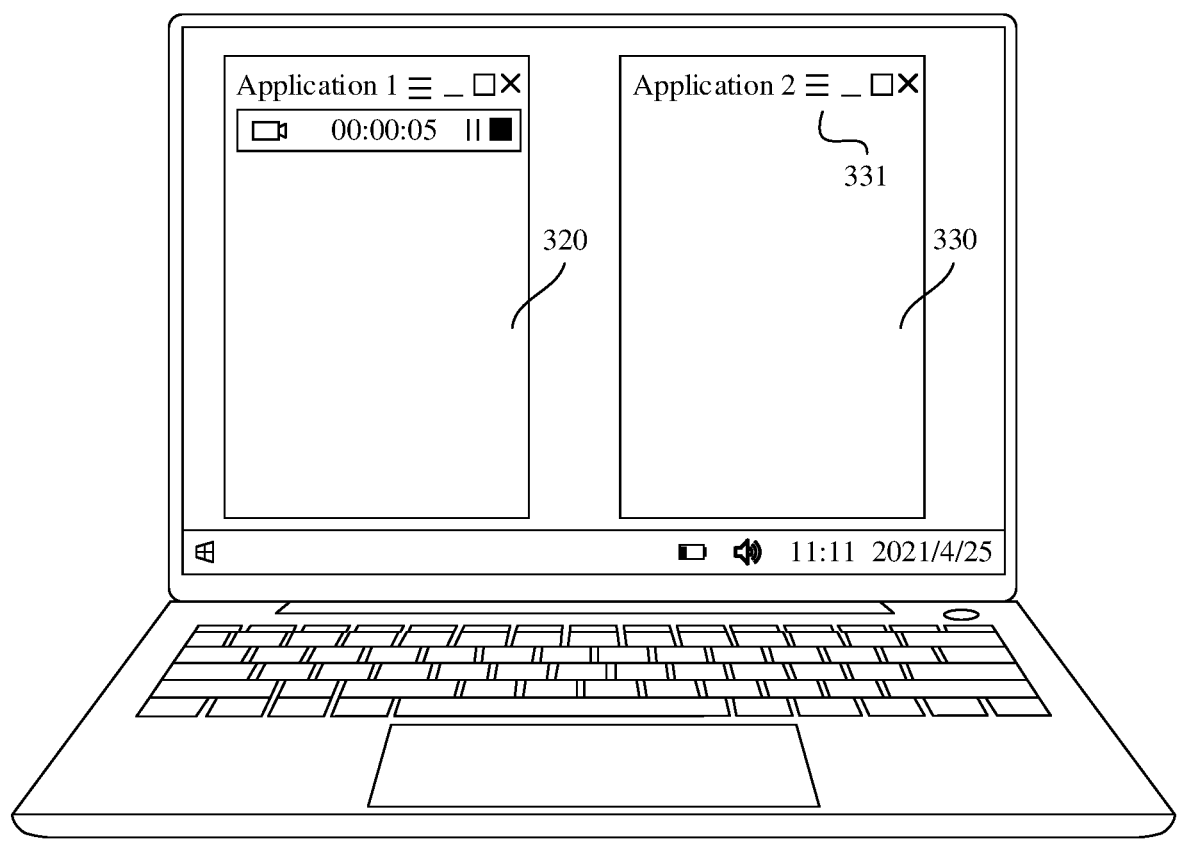
Figures 1, 2, 4C:
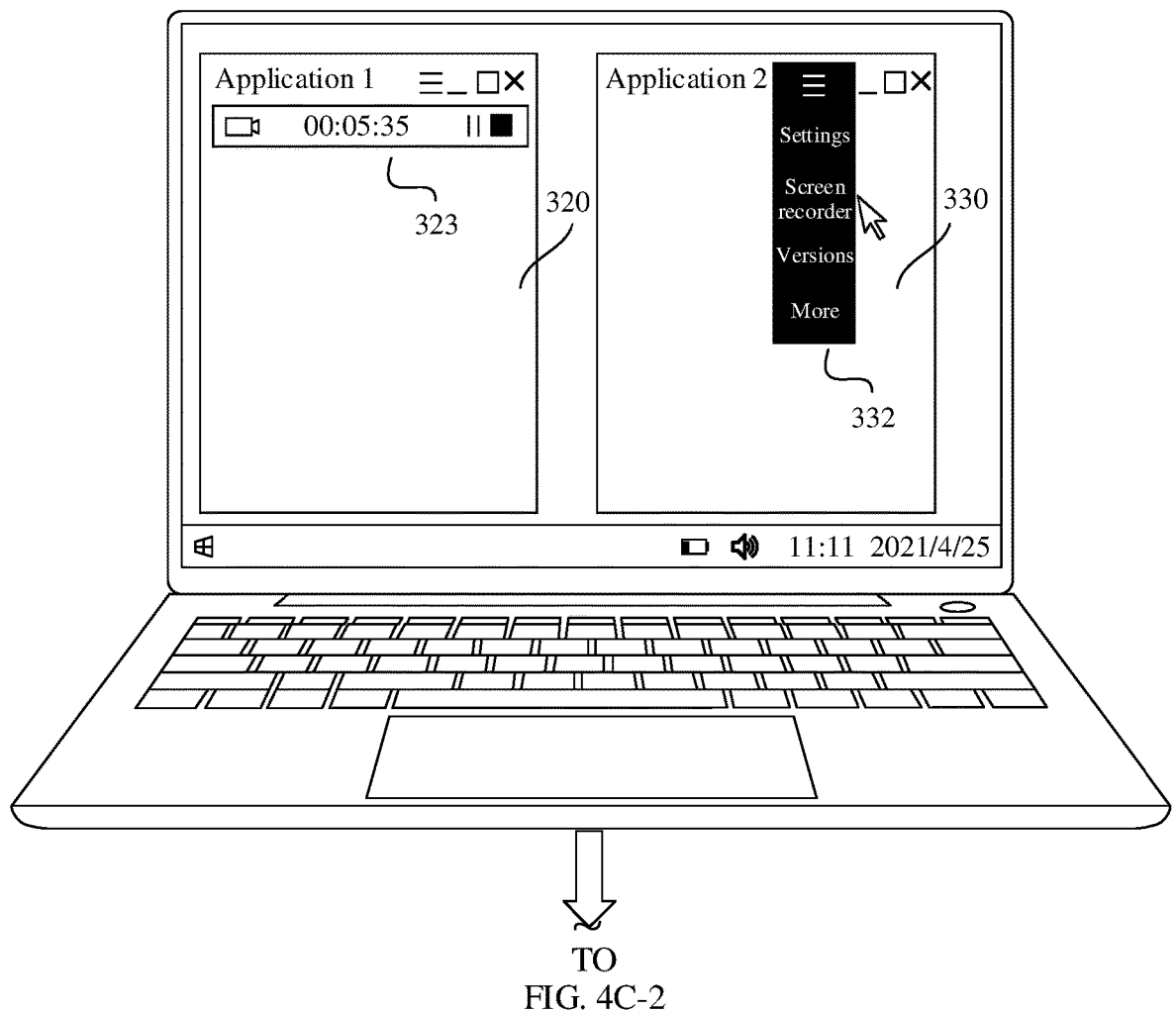
Figures 2, 4C:
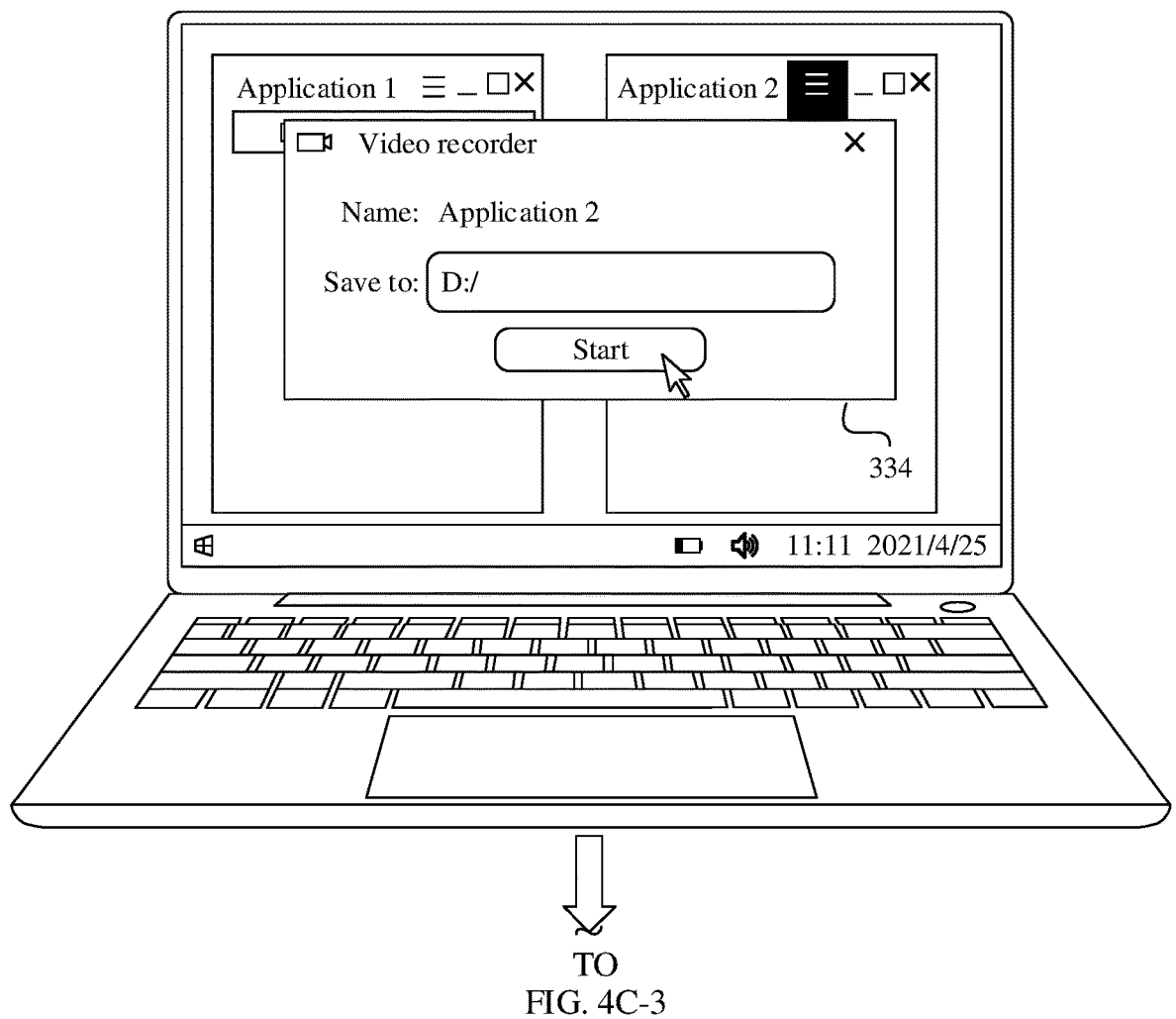
Figures 3, 4C:
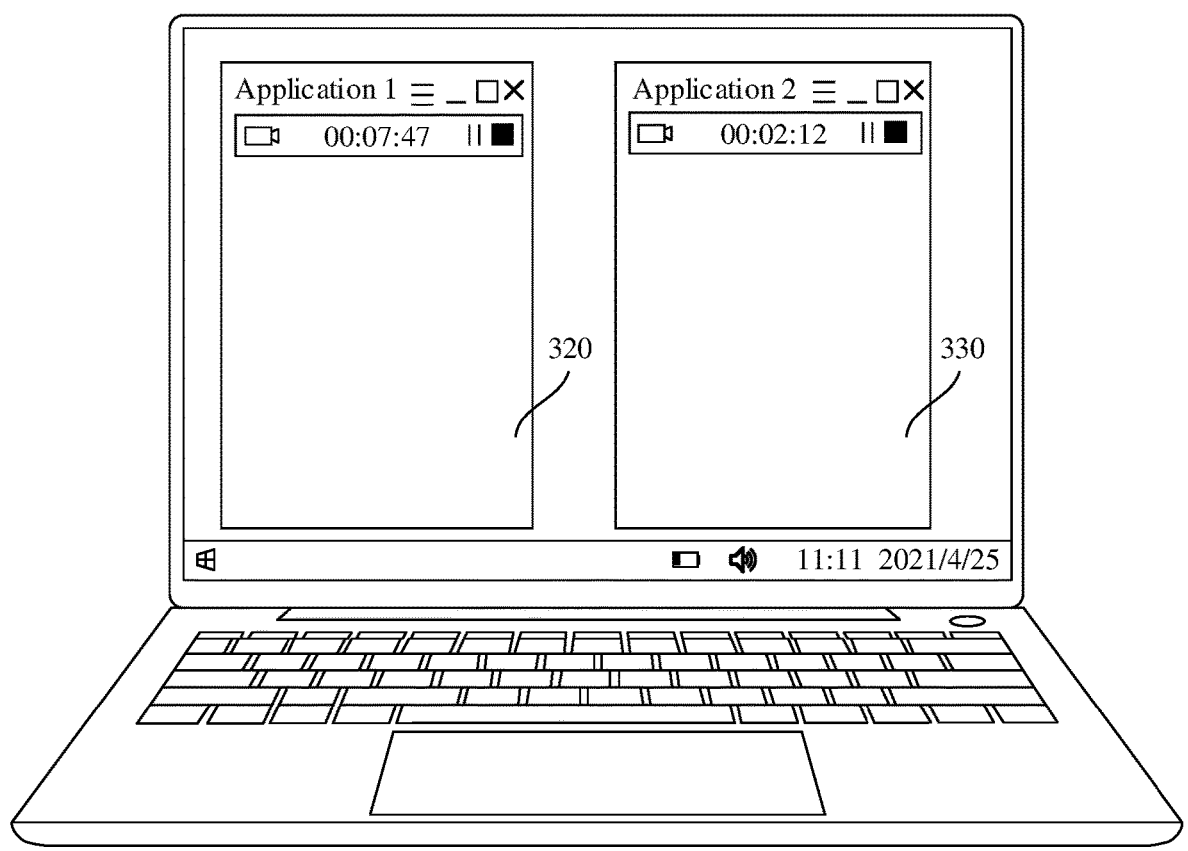

Optionally, in some examples, the user may further select a name and a storage path for a screen recording file. For example, as shown in FIG. 4B-1 to FIG. 4B-3, in response to a click operation performed by the user on the "screen recorder" option in the drop-down menu 322, the computer 100 displays a video recording page 324. The user may enter, on the video recording page 324, a storage name and a storage address for a screen recording file of the application 1. The video recording page 324 further includes a "Start" button. In response to a click operation performed by the user on the "Start" button on the video recording page 324, the computer 100 starts to record the content of the window of the application 1, and the "video recording" toolbar is displayed on the interface 320 of the application 1. As shown in FIG. 4C-1 to FIG. 4C-3, in response to a click operation performed by the user on the "screen recorder" option in the drop-down menu 332, the computer 100 displays a video recording page 334. The user may enter, on the video recording page 334, a storage name and a storage address for a screen recording file of the application 2. The video recording page 334 further includes a "Start" button. In response to a click operation performed by the user on the "Start" button on the video recording page 334, the computer 100 starts to record the content of the window of the application 2, and the "video recording" toolbar is displayed on the interface 330 of the application 2.

As shown in FIG. 4A(a) to FIG. 4C-3, according to the multi-application screen recording method provided in an embodiment of this application, the user can separately perform screen recording on windows of the plurality of Android applications. The window of the application to be recorded can be a focus window or a non-focus window.

The multi-application screen recording method provided in embodiments of this application can be applied to an electronic device on which an Android emulator is installed. For example, the electronic device may include a personal computer (personal computer, PC), a notebook computer, a tablet computer, a netbook, a handheld computer, a smart home device (for example, a smart television, a smart screen, a large screen, or a smart speaker), and an in-vehicle computer. This is not limited in embodiments of this application.

Figure 5:
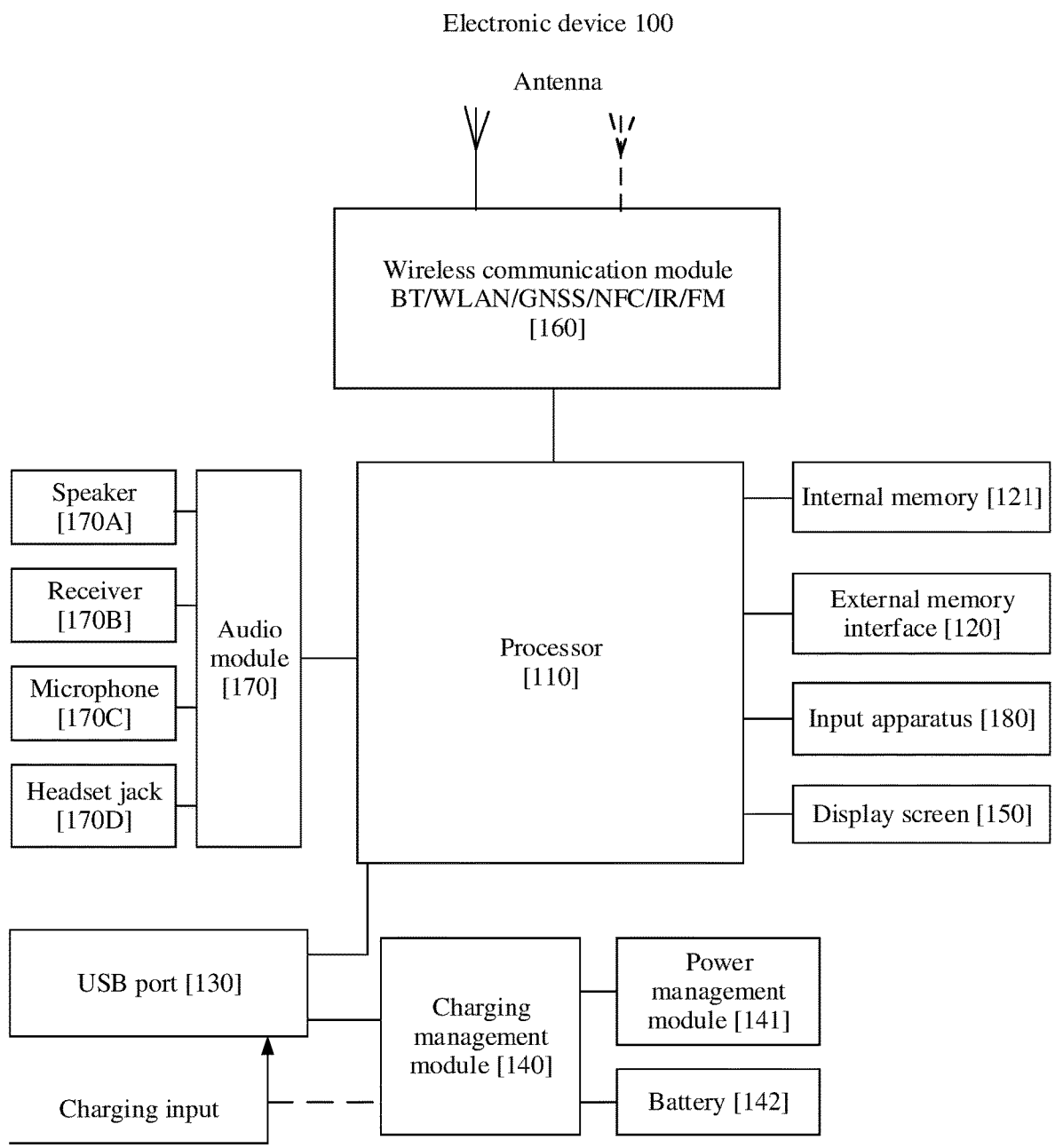
FIG. 5 is a schematic diagram of a hardware structure of an electronic device to which a multi-application screen recording method is applicable according to this application.

In an example, the electronic device may include a structure shown in FIG. 5.

An electronic device 100 includes a processor 110, an external memory interface 120, an internal memory 121, a universal serial bus (USB) port 130, a charging management module 140, a power management module 141, a battery 142, a display screen 150, an antenna, a wireless communication module 160, an audio module 170, a speaker 170A, a receiver 170B, a microphone 170C, a headset jack 170D, an input apparatus 180, and the like.

It may be understood that the structure shown in this embodiment of this application does not constitute a specific limitation on the electronic device. In some other embodiments of this application, the electronic device may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (Application processor, AP), a graphics processing unit (graphics processing unit, GPU), an image signal processor (image signal processor, ISP), a controller, a memory, a video codec, a digital signal processor (digital signal processor, DSP), a neural-network processing unit (neural-network processing unit, NPU), and/or the like. Different processing units may be independent components, or may be integrated into one or more processors.

The controller may be a nerve center and a command center of the electronic device. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, and reduces a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The I2C interface is a two-way synchronization serial bus, and includes a serial data line (SDA) and a serial clock line (derail clock line, SCL). In some embodiments, the processor 110 may include a plurality of groups of I2C buses. The processor 110 may be separately coupled to a touch sensor, a charger, a flash, a camera, and the like through different I2C bus interfaces. For example, the processor 110 may be coupled to the touch sensor through the I2C interface, so that the processor communicates with the touch sensor through the I2C bus interface, to implement a touch function of the electronic device.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170.

The PCM interface may further be configured to: perform audio communication, and sample, quantize, and encode an analog signal. In some embodiments, the audio module 170 may be coupled to the wireless communication module 160 through a PCM bus interface. In some embodiments, the audio module 170 may also transmit an audio signal to the wireless communication module 160 through the PCM interface. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component, for example, the display screen 150 or a keyboard. The MIPI interface includes a camera serial interface (CSI), a display serial interface (DSI), and the like. In some embodiments, the processor 110 communicates with the display screen 150 through the DSI interface, to implement a display function of the electronic device.

The GPIO interface may be configured by using software. The GPIO interface may be configured as a control signal or a data signal. In some embodiments, the GPIO interface may be configured to connect the processor 110 to the display screen 150, the wireless communication module 160, the audio module 170, the input apparatus 180, and the like. The GPIO interface may alternatively be configured as an I2C interface, an I2S interface, a UART interface, a MIPI interface, or the like.

The USB port 130 is an interface that conforms to a USB standard specification, and may be specifically a mini USB port, a micro USB port, a USB type-C port, or the like. The USB port 130 may be configured to connect to a charger to charge the electronic device, or may be configured to transmit data between the electronic device and a peripheral device. For example, the electronic device is connected to a peripheral input device, for example, a keyboard or a mouse, through the port, or the port may alternatively be configured to connect to a headset for playing an audio through the headset. The port may alternatively be configured to connect to another electronic device like an AR device.

It may be understood that an interface connection relationship between the modules shown in this embodiment of this application is merely an example for description, and does not constitute a limitation on the structure of the electronic device. In some other embodiments of this application, the electronic device may alternatively use an interface connection manner different from that in the foregoing embodiments, or a combination of a plurality of interface connection manners.

The charging management module 140 is configured to receive a charging input from a charger. The charger may be a wireless charger or a wired charger. In some embodiments of wired charging, the charging management module 140 may receive a charging input from the wired charger through the USB port 130. In some embodiments of wireless charging, the charging management module 140 may receive a wireless charging input through a wireless charging coil of the electronic device. When charging the battery 142, the charging management module 140 may further supply power to the electronic device by using the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the display screen 150, the wireless communication module 160, and the like. The power management module 141 may be further configured to monitor parameters such as a battery capacity, a battery cycle count, a battery health status (electric leakage or impedance), and the like. In some other embodiments, the power management module 141 may alternatively be disposed in the processor 110. In some other embodiments, the power management module 141 and the charging management module 140 may alternatively be disposed in a same component.

The electronic device implements a display function by using the GPU, the display screen 150, the application processor, and the like. The GPU is a microprocessor for image processing, and is connected to the display screen 150 and the application processor. The GPU is configured to: perform mathematical and geometric computation, and render an image. The processor 110 may include one or more GPUs that execute program instructions to generate or change display information.

The display screen 150 is configured to display an image, a video, and the like. The display screen 150 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light emitting diode (QLED), or the like. In an embodiment of this application, the display screen 150 is also referred to as a screen.

A wireless communication function of the electronic device may be implemented by using the antenna, the wireless communication module 160, and the like.

The antenna is configured to transmit and receive electromagnetic wave signals. Each antenna in the electronic device may be configured to cover one or more communication frequency bands. Different antennas may be multiplexed to improve antenna utilization.

The wireless communication module 160 may provide a wireless communication solution that is applied to the electronic device and that include a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared technology (infrared, IR), and the like. The wireless communication module 160 may be one or more components integrating at least one communication processing module. The wireless communication module 160 receives an electromagnetic wave through the antenna, performs frequency modulation and filtering processing on the electromagnetic wave signal, and sends a processed signal to the processor 110. The wireless communication module 160 may further receive a to-be-transmitted signal from the processor 110, perform frequency modulation and amplification on the signal, and convert a processed signal into an electromagnetic wave for radiation through the antenna.

In some embodiments, in the electronic device, the antenna is coupled to the wireless communication module 160, so that the electronic device can communicate with a network and another device by using a wireless communication technology.

The digital signal processor is configured to process a digital signal, and may process another digital signal in addition to a digital image signal. For example, when the electronic device selects a frequency, the digital signal processor is configured to perform Fourier transform on frequency energy.

The video codec is configured to compress or decompress a digital video. The electronic device may support one or more types of video codecs. In this way, the electronic device can play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. The NPU may implement applications such as intelligent cognition of the electronic device, for example, image recognition, facial recognition, voice recognition, and text understanding.

The external memory interface 120 may be configured to connect to an external storage card, for example, a micro SD card, to extend a storage capability of the electronic device. The external memory card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to perform various function applications of the electronic device and data processing. The internal memory 121 may include a program storage region and a data storage region. The program storage region may store an operating system, an application required by at least one function (for example, a sound playing function and an image playing function), and the like. The data storage region may store data (for example, audio data and a phone book) created during use of the electronic device, and the like. In addition, the internal memory 121 may include a high-speed random access memory, and may further include a non-volatile memory, for example, at least one magnetic disk storage component, a flash memory component, and a universal flash storage (universal flash storage, UFS).

The electronic device may implement an audio function by using the audio module 170, the speaker 170A, the receiver 170B, the microphone 170C, the headset jack 170D, the application processor, and the like, for example, music playing and sound recording.

The audio module 170 is configured to convert digital audio information into an analog audio signal for output, and is also configured to convert an analog audio input into a digital audio signal. The audio module 170 may be configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device may be for listening to music through the loudspeaker 170A.

The receiver 170B, also referred to as an "earpiece", is configured to convert an electrical audio signal into a sound signal.

The microphone 170C, also referred to as a "mike" or a "mic", is configured to convert a sound signal into an electrical signal.

The headset jack 170D is configured to connect to a wired headset. The headset jack 170D may be a USB port 130, or may be a 3.5 mm open mobile terminal platform (OMTP) standard interface or a cellular telecommunications industry association of the USA (cellular telecommunications industry association of the USA, CTIA) standard interface.

The input apparatus 180 may include a keyboard, a mouse, and the like. The keyboard is configured to input an English letter, a number, a punctuation mark, and the like to the electronic device, to send a command and input data and the like to the electronic device. The mouse is an indicator for positioning vertical and horizontal coordinates in a display system of the electronic device, and is configured to input instructions and the like to the electronic device. The input apparatus 180 may be connected to the electronic device in a wired connection manner. For example, the input apparatus 180 is connected to the electronic device through the GPIO interface or the USB port. The input apparatus 180 may alternatively be connected to the electronic device in a wireless manner. For example, the input apparatus 180 is connected to the electronic device in a manner like Bluetooth or infrared.

According to the multi-application screen recording method provided in embodiments of this application, a user can separately perform screen recording on a plurality of Android applications run on the electronic device 100. The following describes in detail the multi-application screen recording method provided in embodiments of this application with reference to the accompanying drawings.

Figures 6A, 6B:
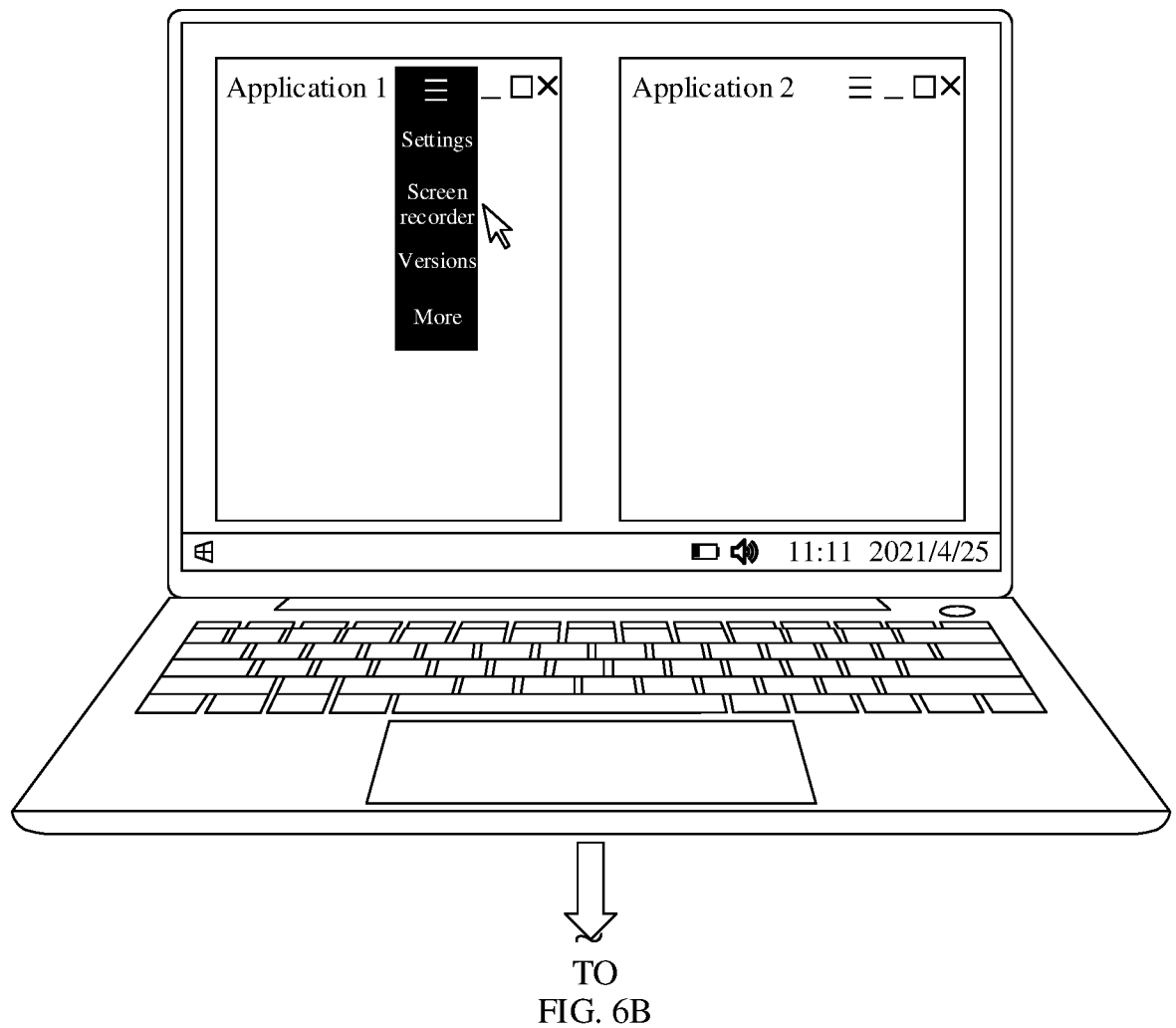
FIG. 6A to FIG. 6C are a schematic diagram of a scenario instance of a multi-application screen recording method according to this application.
Figure 6B:
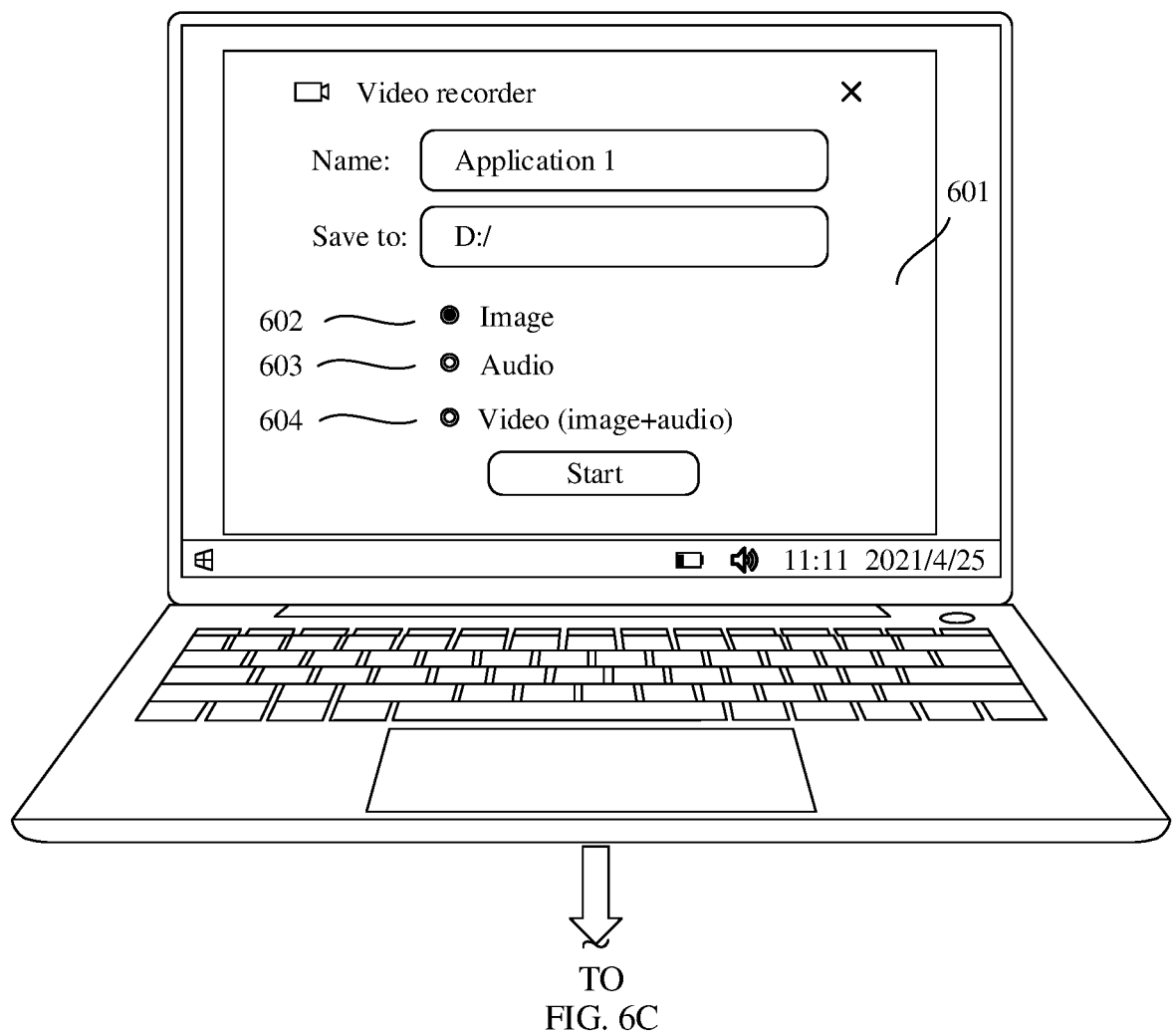
Figure 6C:
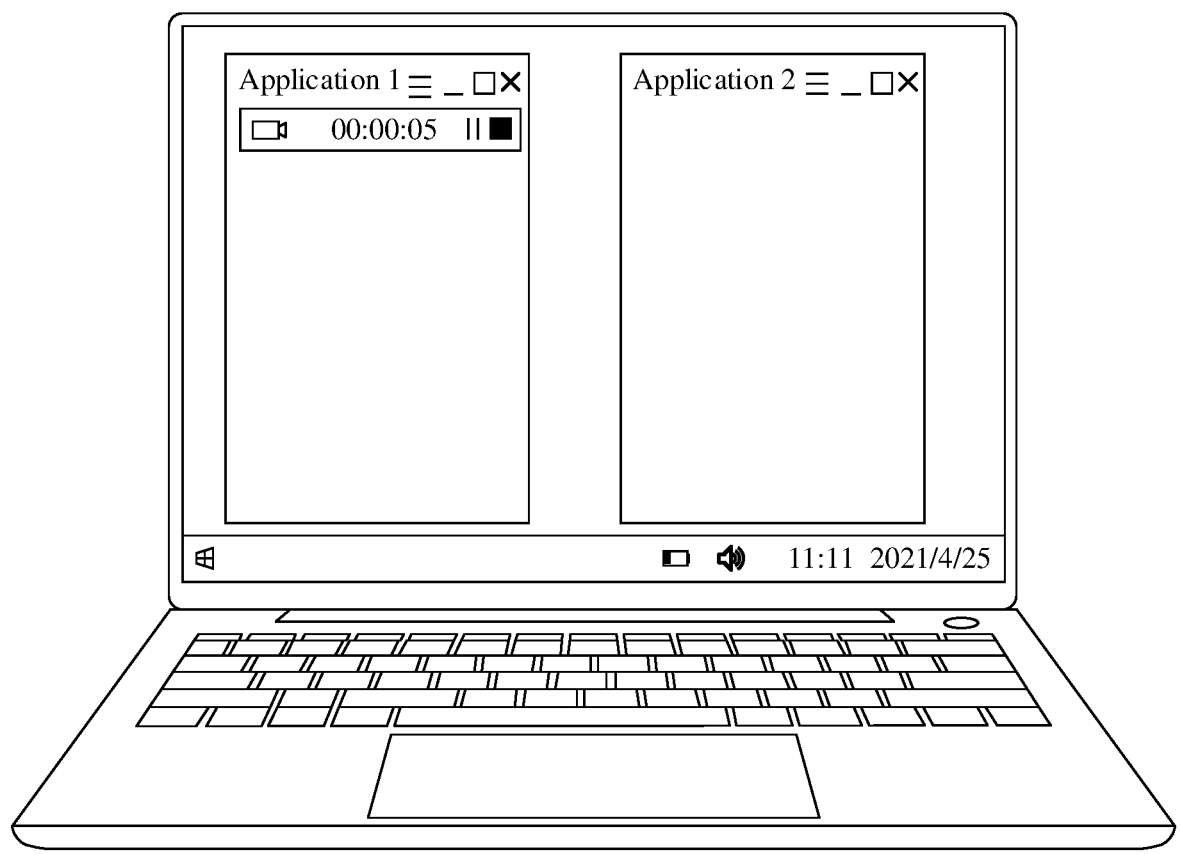

The user may start screen recording on a user interface (user interface, UI) of the Android application. For example, as shown in FIG. 6A to FIG. 6C, in response to a click operation performed by the user on a "screen recorder" option in an application 1, an electronic device 100 displays a video recording page 601. The user may enter, on the video recording page 601, a storage name and a storage address for a screen recording file. The video recording page 601 further includes a "Start" button. In response to a click operation performed by the user on the "Start" button, the electronic device 100 starts screen recording on the Android application. In an example, the video recording page 601 includes an "Image" option 602, an "Audio" option 603, and a "Video" option 604. The "Image" option 602 indicates that only an image is recorded when screen recording is performed on the Android application, the "Audio" option 603 indicates that only an audio is recorded when screen recording is performed on the Android application, and the "Video" option 604 indicates that an image and an audio are recorded when screen recording is performed on the Android application. The user may select the "Image" option 602 to record an image of the application 1, select the "Audio" option 603 to record an audio of the application 1, or select the "Video" option 604 to record a video (including an image and an audio) of the application 1. In some other examples, as shown in FIG. 4A(a) to FIG. 4A(f), in response to a click operation performed by the user on the "screen recorder" option of the application 1, the electronic device 100 starts screen recording on the Android application, to record a video (including an image and an audio) of the application 1.

It may be understood that different recording types may be selected when screen recording is performed on different applications. For example, when screen recording is performed on the application 1, the "Image" option 602 is selected, to record the image of the application 1, and when screen recording is performed on the application 2, the "Audio" option 603 is selected, to record the audio of the application 2. For example, the electronic device records the audio of the application 2 when recording the image of the application 1. For another example, when screen recording is performed on the application 1, the "Image" option 602 is selected, to record the image of the application 1, and when screen recording is performed on an application 2, the "Video" option 604 is selected, to record an image and an audio of the application 2. The electronic device records the image and the audio of the application 2 when recording the image of the application 1.

Figure 7:
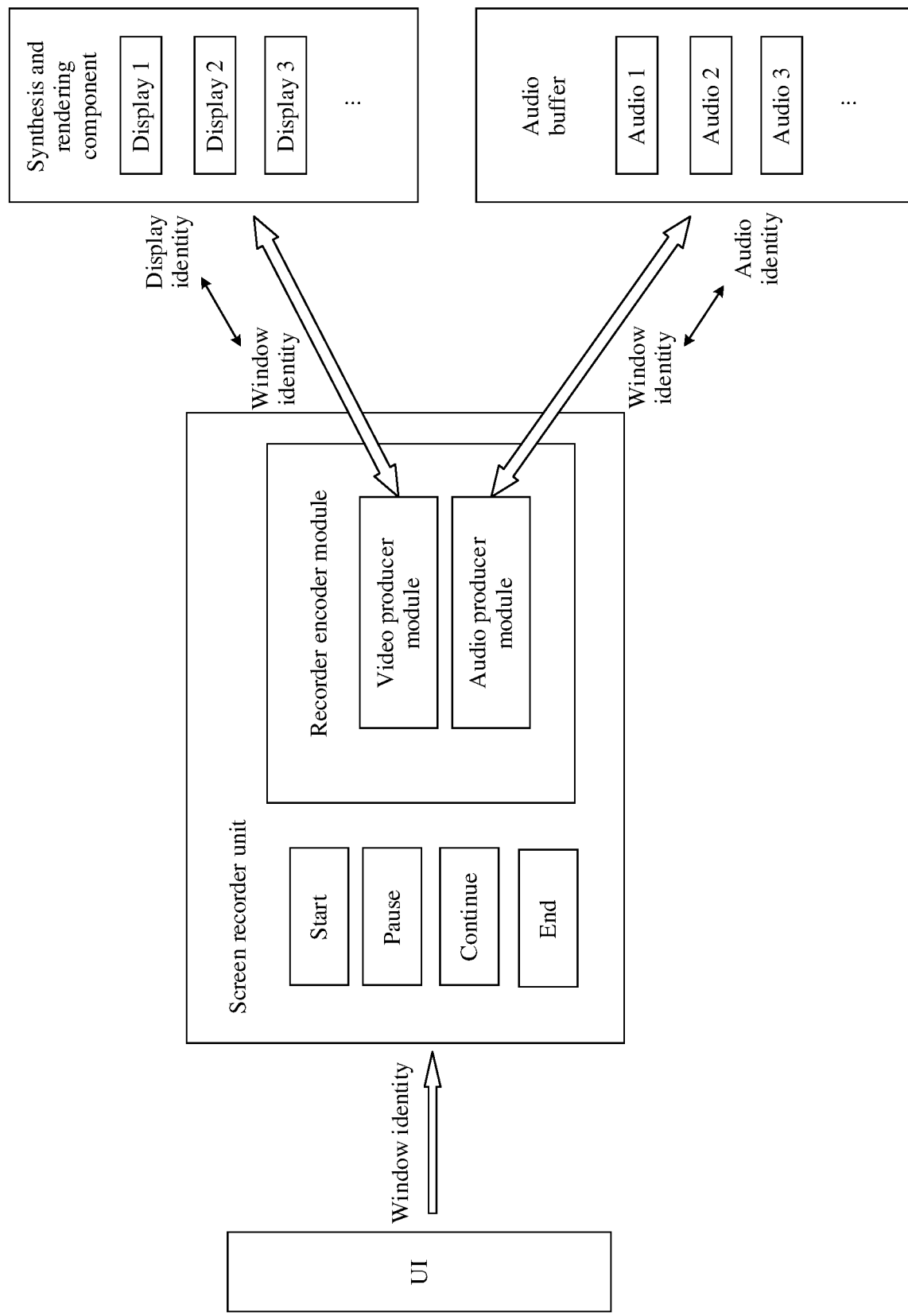
FIG. 7 is a schematic diagram of a multi-application screen recording method according to this application.

For example, as shown in FIG. 7, the electronic device receives an operation of starting screen recording on a user interface of the Android application by the user (for example, receiving a click operation performed by the user on the "Start" button in FIG. 6A to FIG. 6C or receiving a click operation performed by the user on the "screen recorder" option in FIG. 4A(c)), starts screen recording, and records content (an image, audio, or video) of a window of the Android application. The electronic device generates, based on a window identity (window identity, Window ID) of the window of the application, a screen recorder (screen recorder) unit corresponding to the window of the Android application. Optionally, the UI includes "Start", "Pause", "Continue", and "End" button, and the like. The electronic device may start, pause, continue, or end screen recording performed on the window of the application based on a click operation performed by the user on the "Start", "Pause", "Continue", or "End" button on the UI. For example, as shown in FIG. 4A(d), the "video recording" toolbar 323 on the interface 320 of the application 1 includes the recording duration, the pause/continue button, the end button, and the like. The user may pause or continue, by clicking the pause/continue button, screen recording performed on the application 1, and may stop, by clicking the end button, screen recording performed on the application 1.

In an example, the electronic device starts image recording on the Android application based on a user operation. A video producer (video producer) module in the screen recorder (screen recorder) unit obtains, based on a window identity, a corresponding display identity (display identity, Display ID). A display indicated by the display identity is associated with the window of the Android application. One window of the Android application is presented on one display. The electronic device captures image data of the window of the Android application from a synthesis and rendering component based on the display identity, and sends the image data to a recorder encoder (recorder encoder) module for video encoding and encapsulation, to generate an image file, so as to complete image recording performed on content displayed in the window of the Android application.

In an example, the electronic device starts audio recording on the Android application based on a user operation. An audio producer (audio producer) module in the screen recorder (screen recorder) unit obtains, based on a window identity, a corresponding audio identity, and each audio identity is separately associated with different windows of the Android application. The electronic device captures audio data of the window of the Android application from an audio buffer based on the audio identity, and sends the audio data to a recorder encoder (recorder encoder) module for video encoding and encapsulation, to generate an audio file, so as to complete audio recording performed on audio content of the window of the Android application.

In an example, the electronic device starts video recording on the Android application based on a user operation, that is, records an image and an audio of the Android application. A video producer (video producer) module in the screen recorder (screen recorder) unit obtains, based on a window identity, a corresponding display identity, and the electronic device captures image data of the window of the Android application from a synthesis and rendering component based on the display identity. The audio producer (audio producer) module in the screen recorder (screen recorder) unit obtains, based on a window identity, a corresponding audio identity, and the electronic device captures audio data of the window of the Android application from an audio buffer based on the audio identity. The recorder encoder (recorder encoder) module performs video encoding and encapsulation on the image data and the audio data, to generate a video file, so as to complete video recording performed on content of the window of the Android application.

Figure 8:
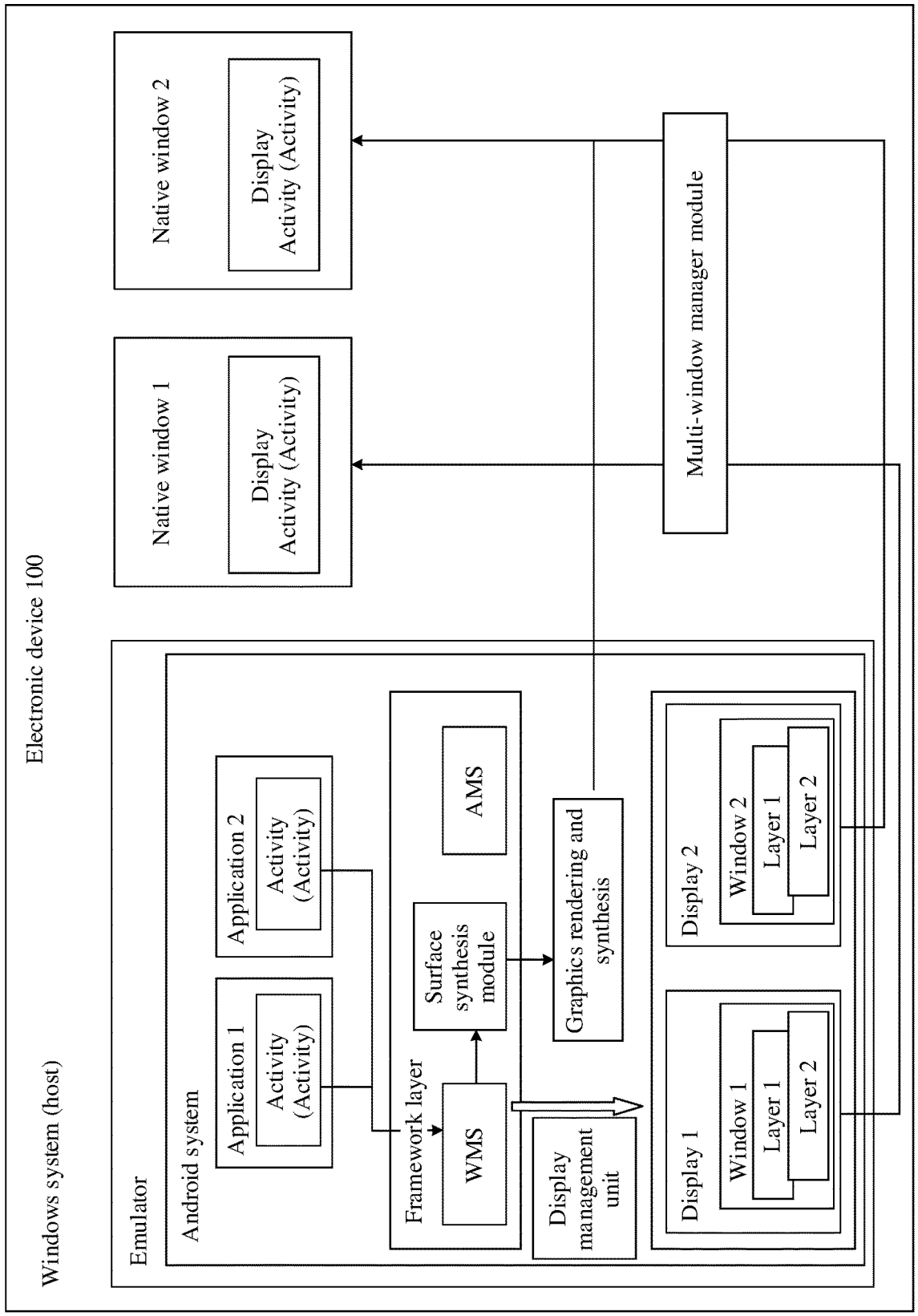
FIG. 8 is a schematic diagram of a multi-application screen recording method according to this application.
Figure 9:
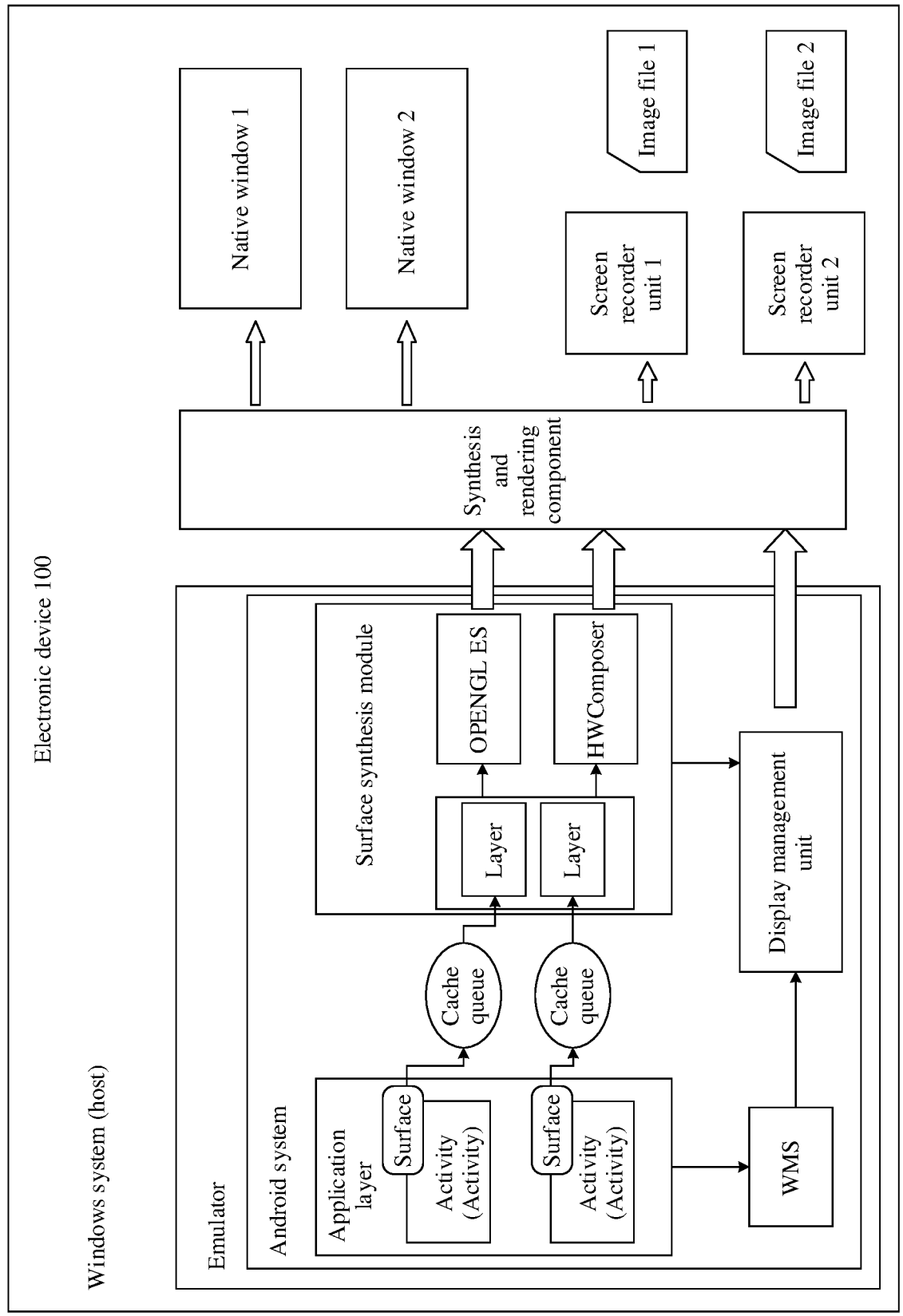
FIG. 9 is a schematic diagram of a multi-application screen recording method according to this application.

With reference to FIG. 8 and FIG. 9, the following describes in detail a process in which an electronic device generates an image file.

It should be noted that, in FIG. 8 and FIG. 9, an example in which the electronic device runs two Android applications and displays two windows of the Android applications is used for description. It may be understood that the multi-application screen recording method provided in embodiments of this application is also applicable to a case in which there are more than two windows of Android applications.

In an example, a user runs an application 1 and an application 2 on the electronic device. For example, as shown in FIG. 4A(a), the user clicks, by using the input device of the computer 100, the "Application 1" icon 311 to start the application 1, and clicks the "Application 2" icon 312 to start the application 2.

As shown in FIG. 8, the application 1 and the application 2 are started and run, and an activity (Activity) corresponding to each of the application 1 and the application 2 is generated in an Android system. One Android application includes one or more interfaces. Each interface corresponds to one activity, and one activity includes one or more layers (layers). Each layer includes one or more elements (controls).

A framework (framework) layer of the Android system includes a window manager service (window manager service, WMS), a surface synthesis (SurfaceFlinger) module, an activity manager service (Activity manager service, AMS), and the like.

The WMS is for window management (for example, adding, deleting, or modifying a window). When the application 1 is started, the WMS creates a window 1 corresponding to the application 1. When the application 2 is started, the WMS creates a window 2 corresponding to the application 2. A display management unit creates a display (Display) corresponding to each window, and establishes a one-to-one correspondence between the window and the display, that is, establishes a one-to-one correspondence between a window identity (window identity, Window ID) and a display identity (display identity, Display ID). For example, the display management unit creates a display 1 for the window 1, and creates a display 2 for the window 2, establishes a correspondence between the display 1 and the application 1, and establishes a correspondence between the display 2 and the application 2.

The Android system sends a display identity and window information (for example, a window identity, a quantity of layers, and a layer identity) of each display to a host (Host). The host creates a native window (native window) corresponding to each display based on the display identity and the window information. For example, the host includes a multi-window manager (multi-window manager) module, for implementing service logic such as creation, destruction and window operation of the native window. For example, the multi-window manager module creates a native window 1 corresponding to the window 1, and creates a native window 2 corresponding to the window 2.

The surface synthesis (SurfaceFlinger) module is for obtaining, from the WMS, display data (for example, a quantity of layers included in an interface and a display element of each layer) of an interface of each Android application. SurfaceFlinger determines, based on the display data of the interface of the Android application, a synthesis instruction (for example, an OPENGL ES instruction or an HWComposer instruction) corresponding to each piece of display data, and transmits the synthesis instruction corresponding to the display data to the host.

A synthesis and rendering component (which may invoke a graphics rendering and synthesis function of the Android system) of the host converts the received synthesis instruction into an instruction whose format matches an operating system of the host, and performs graphics synthesis on the display data by using the synthesis instruction, to generate an image of each layer of the Android application interface; and performs synthesis and rendering on the image of each layer, to generate the interface corresponding to the activity. The synthesis and rendering component sends, based on the display identity and the window information, the generated interface to a corresponding native window for display. For example, SurfaceFlinger obtains display data 1 of an activity of the application 1 from the WMS, and transmits the display data 1 and a corresponding synthesis instruction to the host. The synthesis and rendering component of the host performs graphics synthesis on the display data 1 by using the synthesis instruction, to generate an image of each layer, and performs synthesis and rendering on the image of each layer, to generate an interface of the application 1. The synthesis and rendering component sends, based on a display identity and window information of the application 1, the interface of the application 1 to the corresponding native window 1 for display. SurfaceFlinger obtains display data 2 of an activity of the application 2 from the WMS, and transmits the display data 2 and a corresponding synthesis instruction to the host. The synthesis and rendering component of the host performs graphics synthesis on the display data 2 by using the synthesis instruction, to generate an image of each layer, and performs synthesis and rendering on the image of each layer, to generate an interface of the application 2. The synthesis and rendering component sends, based on a display identity and window information of the application 2, the interface of the application 2 to the corresponding native window 2 for display. For example, as shown in FIG. 4A(b), the electronic device 100 displays the interface 320 of the application 1 and the interface 330 of the application 2. The electronic device 100 simultaneously displays the window of the application 1 and the window of the application 2.

The user may record an image of the window of the application 1, and may also record an image of the window of the application 2. In an example, as shown in FIG. 9, after the Android application is started, each interface of the Android application correspondingly generates an activity at an application layer. The WMS allocates one or more surfaces (Surfaces) to each Android application. One activity corresponds to one surface. The WMS manages a display order, a size, and a location of the surface. The Android application, as a producer, draws display data of the activity to a surface and places the data into a cache queue for a consumer for processing. SurfaceFlinger, as the consumer, obtains, from the cache queue for image synthesis, a layer corresponding to the surface, and sends a synthesis instruction (an OPENGL ES instruction or an HWComposer instruction) corresponding to the display data to the host.

The WMS allocates a window to each Android application. The display management unit obtains, from the WMS, a display ID and window information that corresponds to the window, and obtains display data of each layer of the interface of the Android application from the surface synthesis module. The display management unit sends the display ID, the window information, and the display data of the interface to the host. The host creates a native window corresponding to each display (Display) based on the display ID and the window information. For example, the display 1 corresponds to the native window 1, and the display 2 corresponds to the native window 2. It should be noted that functions of the display management unit in FIG. 8 and FIG. 9 are implemented by the Android system. In some other embodiments, functions of the display management unit may alternatively be implemented by an emulator.

The synthesis and rendering component of the host includes a synthesis module and a rendering module. The synthesis module performs graphics synthesis on display data of each interface by using a synthesis instruction, to generate the image of each layer of the interface. The rendering module renders the image of each layer, to generate the interface. The synthesis and rendering component sends, for display based on the display ID, the interface to a native window (native window) corresponding to the display (Display). For example, the interface corresponding to the display 1 (the application 1) is sent to the native window 1 for display, and the interface corresponding to the display 2 (the application 2) is sent to the native window 2 for display.

The user starts image recording performed on the window of the application 1. The electronic device generates a screen recorder unit 1 of the application 1. The screen recorder unit 1 obtains, based on a window identity (the window 1) of the application 1, a corresponding display identity (the display 1), captures a color buffer corresponding to the display 1 from the synthesis and rendering component, obtains the interface corresponding to the display 1, and performs video encoding and encapsulation on the interface corresponding to the display 1, to generate an image file 1.

In an image recording process, an interface (namely, content displayed in a window of an application) corresponding to the window of the application is captured in the Android system by using a one-to-one correspondence between a window identity and a display identity of the window of the application, to implement directional recording performed on content displayed in the window of the application. The window of the application may be a focus window or a non-focus window. This has no impact on the recording performed on the content displayed in the window of the application. For example, in a process of recording the window of the application 1, the user starts the application 2. The window of the application 2 is a focus window, and the window of the application 1 changes from a focus window to a non-focus window. Image recording performed on the window of the application 1 is not affected.

In an example, in a recording process of the application 1, the user starts image recording performed on the application 2. The electronic device generates a screen recorder unit 2 of the application 2. The screen recorder unit 2 obtains, based on a window identity (the window 2) of the application 2, a corresponding display identity (the display 2), captures a color buffer (color buffer) corresponding to the display 2 from the synthesis and rendering component, obtains the interface corresponding to the display 2, and performs video encoding and encapsulation on the interface corresponding to the display 2, to generate an image file 2.

Figure 10:
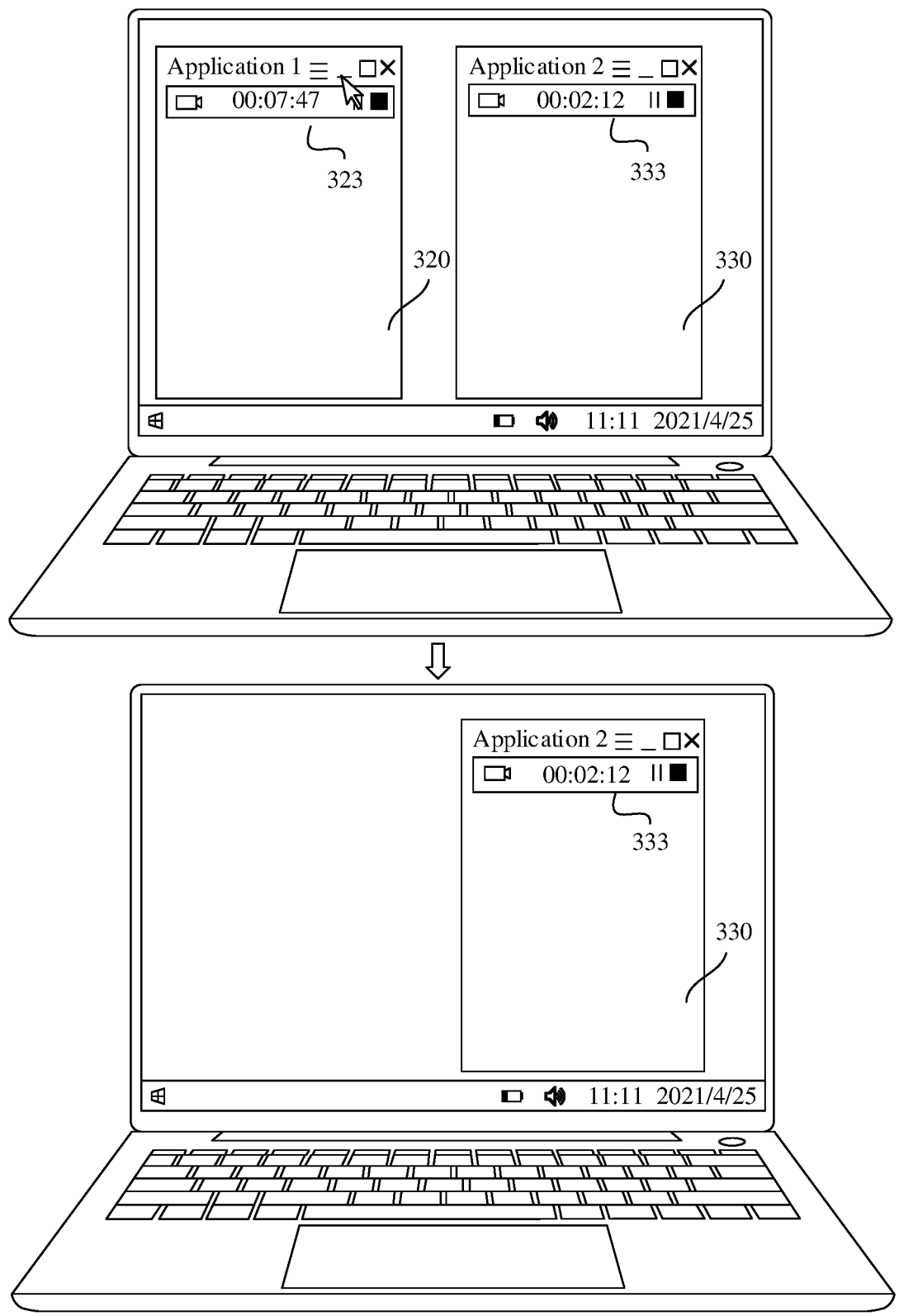
FIG. 10 is a schematic diagram of a scenario instance of a multi-application screen recording method according to this application.

In some embodiments, in a process of performing image recording on the application, the application is switched from a foreground for display to the background for running. For example, as shown in FIG. 10, the computer 100 displays the interface 320 of the application 1 and the interface 330 of the application 2. The user performs video recording on the application 1, and the "video recording" toolbar 323 is displayed on the interface 320 of the application 1. The user further performs video recording on the application 2, and the "video recording" toolbar 333 is displayed on the interface 330 of the application 2. The interface 320 of the application 1 includes a "minimize" button. The user may click the "minimize" button on the interface 320, to switch the application 1 to a background for running. For example, in response to receiving an operation of clicking the "minimize" button on the interface 320 by the user, the computer 100 stops displaying the interface 320 of the application 1.

Methods for changing a life cycle of the activity include creating (onCreate), starting (onStart), continuing (onResume), pausing (onPause), stopping (onStop), destroying (onDestroy), and the like. For ease of understanding, in this application, performing one of the foregoing methods means entering a state of the method.

In an implementation, the application is switched from the foreground for display to the background for running, and the host (Windows) notifies the Android system that the application is switched to the background for running. The life cycle of the activity corresponding to the application enters onPause. In an onPause life cycle, the activity pauses generating the display data. For example, the application 1 is switched to the background for running, the activity corresponding to the application 1 pauses generating display data of the application 1, and the synthesis and rendering component pauses sending the interface of the application 1 to the native window 1. The screen recorder unit 1 of the application 1 on the host pauses capturing, from the synthesis and rendering component, the color buffer (color buffer) corresponding to the display 1, that is, pauses screen recording performed on the application 1. If the application is switched from the background for running to the foreground for display, the host notifies the Android system that the application is switched to the foreground for display. The life cycle of the activity corresponding to the application exits onPause and enters onResume. The display data of the activity continues to be generated. For example, the application 1 is switched to the foreground for display, the activity corresponding to the application 1 continues to generate display data of the application 1, and the synthesis and rendering component continues to send the interface of the application 1 to the native window 1. The native window 1 continues to display the interface of the application 1. The screen recorder unit 1 of the application 1 on the host continues to capture the color buffer corresponding to the display 1 from the synthesis and rendering component, that is, continues to perform screen recording on the application 1. For example, the application 1 is a video playing application. When the application 1 is switched to the background for running, playing of a video is paused, and screen recording performed on a video playing interface is paused. When the application 1 is switched from the background for running to the foreground for display, playing of the video is continued, and screen recording performed on a video playing interface is continued.

In another possible manner, before notifying the Android system that the application is switched to the background for running, the host (Windows) determines whether screen recording is being performed on the application. If screen recording is being performed on the application, the host (Windows) does not notify the Android system that the application enters the background (which may be understood as not performing an operation of notifying a foreground/background state change of the application). In this way, the application is not displayed on the Windows side, and screen recording can still be performed normally.

In another implementation, the application is switched from the foreground for display to the background for running, and the synthesis and rendering component of the host stops sending the interface of the application to a native window for display. For example, the application 1 is switched to the background for running, and the synthesis and rendering component stops sending the interface of the application 1 to the native window 1 for display. The application is switched from the background for running to the foreground for display, and the synthesis and rendering component of the host continues to send the interface of the application to the native window for display. For example, the application 1 is switched to the foreground for display, and the synthesis and rendering component continues to send the interface of the application 1 to the native window 1 for display. When the application is run in the background, the screen recorder unit on the host may obtain the interface of the application from the synthesis and rendering component, and screen recording on the application is not affected. For example, the application 1 is a video playing application. When the application 1 is switched to the background for running, display of the video playing interface is stopped, the video continues to be played in the background, and screen recording performed on the video playing interface is not affected.

In the multi-application screen recording method provided in embodiments of this application, a native window is created for each Android application on the host, and the native window is in a one-to-one correspondence with a display in the Android system. Display data and a synthesis instruction that correspond to the display (display) in the Android system are transmitted to the host for rendering and synthesis, and are sent to a corresponding native window for display. When the image of the window of the application is recorded, the corresponding display identity is obtained based on the window identity of the window of the application, and the interface of the Android application is obtained in the Android system based on the display identity, that is, the image of the window of the application is obtained. An image recording channel of the window of each application is independent, to independently record the image of the window of each application.

Figure 11:
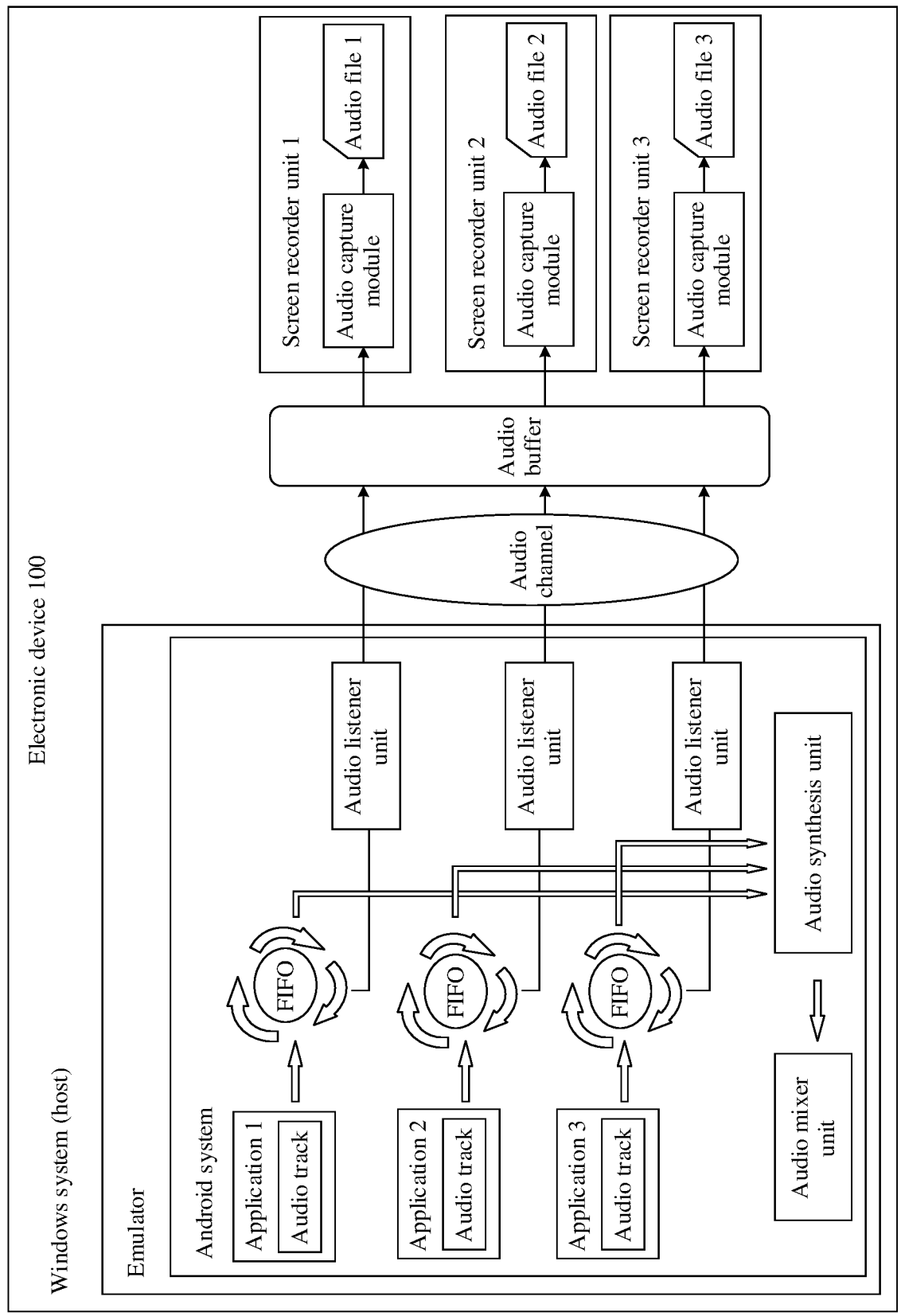
FIG. 11 is a schematic diagram of a multi-application screen recording method according to this application.

With reference to FIG. 11, the following describes in detail a process in which an electronic device generates an audio file.

It should be noted that, in FIG. 11, an example in which the electronic device runs three Android applications is used for description. It may be understood that the multi-application screen recording method provided in embodiments of this application is also applicable to a case in which there are more than three Android applications.

In an example, as shown in FIG. 11, the electronic device runs a plurality of Android applications, for example, including an application 1, an application 2, and an application 3. When each Android application is started, an audio track (audio track) instance corresponding to an audio stream of the Android application is created, and is registered with an audio synthesis (AudioFlinger) unit. For example, one audio track instance corresponds to one audio identity. Data of each audio track instance is transmitted to AudioFlinger through a corresponding cache queue. For example, the cache queue is a first input first output (first input first output, FIFO) cache queue. AudioFlinger synthesizes data of audio track instances into audio streams, transmits the audio streams of the Android applications to an audio mixer (audio mixer) unit for mixing, and transmits a mixed audio to audio hardware (for example, a speaker) for playing. It may be understood that the electronic device plays a mixed audio of the application 1, the application 2, and the application 3.

The electronic device receives an operation of starting audio recording performed by a user, and generates a screen recorder unit corresponding to a window of an application. In addition, the audio track instance corresponding to each Android application is registered with a corresponding audio listener (audio listener) unit. For example, the user starts audio recording performed on the application 1, and a screen recorder unit 1 is generated; the user starts audio recording performed on the application 2, and a screen recorder unit 2 is generated; and the user starts audio recording performed on the application 3, and a screen recorder unit 3 is generated. Each audio listener unit obtains the data of the audio track instance from the corresponding cache queue, and transmits the data of the audio track instance to an audio buffer of a host through an audio channel. Each screen recorder unit obtains a corresponding audio identity based on a window identity. An audio capture (audio capture) module in the screen recorder unit obtains, from an audio buffer based on the audio identity, audio data corresponding to the Android application, and performs processing such as encoding and encapsulation on the audio data, to generate an audio file corresponding to the window of the Android application. For example, a function of the audio capture (audio capture) module may be implemented by the audio producer (audio producer) module in FIG. 7. For example, the screen recorder unit 1 obtains audio data of a window 1 (the application 1) from the audio buffer to generate an audio file 1, the screen recorder unit 2 obtains audio data of a window 2 (the application 2) from the audio buffer to generate an audio file 2, and the screen recorder unit 3 obtains audio data of a window 3 (the application 3) from the audio buffer to generate an audio file 3.

In some embodiments, in a process of performing audio recording on the application, the application is switched from a foreground for display to a background for running. In an implementation, the application is switched from the foreground for display to the background for running, and the host notifies an Android system that the application is switched to the background for running. Generation of the data of the audio track instance of the application is paused. The audio listener unit pauses sending the data of the audio track instance of the application to the audio buffer. The screen recorder unit of the application on the host pauses obtaining the audio data of the application from the audio buffer, that is, pauses performing audio recording on the application. The application is switched from the background for running to the foreground for display, and the host notifies the Android system that the application is switched to the foreground for display. Generation of the data of the audio track instance of the application is continued. The audio listener unit continues to send the data of the audio track instance of the application to the audio buffer. The screen recorder unit of the application on the host continues to obtain the audio data of the application from the audio buffer, that is, continues to perform audio recording on the application.

In the multi-application screen recording method provided in embodiments of this application, the corresponding audio listener unit is created for audio recording performed on the window of each Android application, and the audio listener unit captures the corresponding audio data from the audio track instance of the Android application, to implement directional capture and recording of the audio stream of the Android application. Each audio listener unit is independent, and an audio data recording channel is independent, to independently perform audio recording on the window of each application.

In some other embodiments, the user starts to perform video recording on the window of the application. The electronic device obtains display data of the Android application according to the method shown in FIG. 9, obtains audio data of the Android application according to the method shown in FIG. 11, and mixes the display data and the audio data into a stream to generate a video file of the Android application. In this way, video recording is independently performed on the window of each application.

In some embodiments, the electronic device mixes images and audios of different Android applications into a stream. For example, the electronic device records an image of the application 1, records an audio of the application 2, and mixes the image of the window of the application 1 and the audio of the application 2 into a stream, to generate a video file. In this way, the user can synthesize the images and the audio of the different Android applications into a new video, and can further perform underscoring and the like on the image of the window of the Android application. This improves use enjoyment of the user.

In some embodiments, the electronic device mixes the image of the Android application and an audio of an input device into a stream. For example, the application 1 is a video-type Android application; the electronic device obtains the image of the window of the application 1; the electronic device further receives a voice input from a microphone, and mixes the image of the window of the application 1 and the voice input of the microphone into a stream, to generate a video file. In this way, the user can perform image underscoring, dubbing, and the like on an Android application. This improves use enjoyment of the user.

It should be noted that, in the foregoing embodiments of this application, an example in which an Android emulator is run on the electronic device is used for description. In some other embodiments, the Android system and a non-Android system may be run on different electronic devices. For example, according to the multi-application screen recording method provided in embodiments of this application, a function of the Android system is implemented on an electronic device 1, and a function of the host is implemented on an electronic device 2. The Android system and the non-Android system are run on the different electronic devices. For specific implementations of the foregoing functional modules, refer to corresponding descriptions of the foregoing embodiments. Details are not described herein again.

It may be understood that, to implement the foregoing functions, the electronic device includes a hardware structure and/or a software module to perform each corresponding function. A person skilled in the art should be easily aware that, in combination with the examples described in embodiments disclosed in this specification, units, algorithms, and steps may be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In embodiments of this application, the electronic device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example, is merely logical function division, and may be other division during actual implementation.

Figure 12:
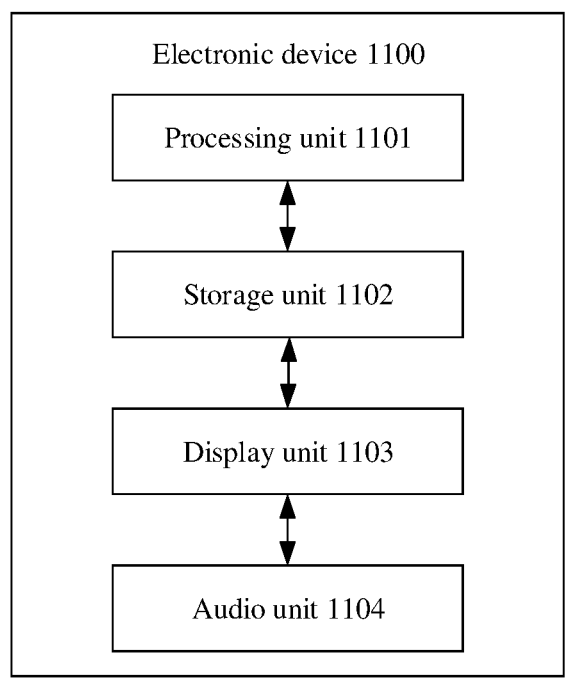
FIG. 12 is a schematic diagram of structural composition of an electronic device according to an embodiment of this application.

In an example, FIG. 12 is a schematic diagram of a possible structure of an electronic device in the foregoing embodiments. An electronic device 1100 includes a processing unit 1101, a storage unit 1102, a display unit 1103, and an audio unit 1104.

The processing unit 1101 is configured to control and manage an action of the electronic device 1100. For example, the processing unit may be configured to obtain display data of an Android application, or may be configured to obtain audio data of an Android application, and/or perform another processing step in embodiments of this application.

The storage unit 1102 is configured to store program code and data of the electronic device 1100, for example, may be configured to store an image file, an audio file, and a video file.

The display unit 1103 is configured to display an interface of the electronic device 1100, for example, may be configured to display a UI of the Android application.

The audio unit 1104 is used by the electronic device 1100 to receive an audio input or play an audio.

Certainly, the unit modules in the electronic device 1100 include but are not limited to the processing unit 1101, the storage unit 1102, the display unit 1103, and the audio unit 1104. For example, the electronic device 1100 may further include a power supply unit. The power supply unit is configured to supply power to the electronic device 1100.

The processing unit 1101 may be a processor or a controller, for example, may be a central processing unit (CPU), a digital signal processor (DSP), an application-specific integrated circuit (ASIC), a field programmable gate array (FPGA) or another programmable logic device, a transistor logic device, a hardware component, or any combination thereof. The storage unit 1102 may be a memory. The display unit 1103 may be a display. The audio unit 1104 may be a microphone, a speaker, or the like.

For example, the processing unit 1101 is a processor (the processor 110 shown in FIG. 5), the storage unit 1102 may be a memory (the internal memory 121 shown in FIG. 5), the display unit 1103 is a display screen (the display screen 150 shown in FIG. 5, where the display screen 150 may be a touchscreen, and a display panel and a touch panel may be integrated into the touchscreen), and the audio unit 1104 is an audio module (the audio module 170 shown in FIG. 5). The electronic device 1100 provided in an embodiment of this application may be the electronic device 100 shown in FIG. 5. The processor, the memory, the display screen, the speaker, the microphone, and the like may be connected together, for example, connected through a bus.

An embodiment of this application further provides a computer-readable storage medium. The computer-readable storage medium stores computer program code. When a processor executes the computer program code, an electronic device performs the method in the foregoing embodiments.

An embodiment of this application further provides a computer program product. When the computer program product runs on a computer, the computer is enabled to perform the method in the foregoing embodiments.

The electronic device 1100, the computer-readable storage medium, and the computer program product provided in embodiments of this application are configured to perform the corresponding methods provided above. Therefore, for beneficial effects that can be achieved by the electronic device, the computer-readable storage medium, and the computer program product, refer to the beneficial effects in the corresponding methods provided above. Details are not described herein again.

Based on the descriptions of the foregoing implementations, a person skilled in the art may clearly understand that, for the purpose of convenient and brief description, division into the foregoing functional modules is merely used as an example for description. During actual application, the functions may be allocated to different functional modules for implementation based on a requirement. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into the modules or the units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between apparatuses or units may be implemented in electrical, mechanical, or other forms.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, for example, a USB flash drive, a removable hard disk, a ROM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A multi-application screen recording method, comprising:
   receiving a first operation in a window of a first application on an electronic device;
   in response to receiving the first operation, screen recording, by the electronic device, a content displayed on the window of the first application;
   receiving a second operation in a window of a second application on the electronic device;
   in response to receiving the second operation, screen recording, by the electronic device, a content displayed on the window of the second application, wherein the first application and the second application are run in an Android system, and the window of the first application and the window of the second application are displayed in a non-Android system; and
   after screen recording the content displayed on the window of the second application for a first duration, stopping, by the electronic device, the screen recording of the content displayed on the window of the first application.

2. The method according to claim 1, wherein the method further comprises:
   generating a first screen recording file based on the content displayed on the window of the first application; and
   generating a second screen recording file based on the content displayed on the window of the second application.

3. The method according to claim 2, wherein the non-Android system comprises a Windows system, and the method further comprises:
   creating, by the Android system, a first display corresponding to the window of the first application;
   creating, by the Android system, a second display corresponding to the window of the second application;
   generating, by the Windows system, an interface of the first application based on image data of the first display, and generating the first screen recording file based on the interface of the first application; and
   generating, by the Windows system, an interface of the second application based on image data of the second display, and generating the second screen recording file based on the interface of the second application.

4. The method according to claim 3,
   wherein the generating the interface of the first application comprises:
      receiving, by the Windows system from the Android system, the image data of the first display and a first synthesis instruction of the image data of the first display; and
      obtaining, based on the first synthesis instruction, a first Windows synthesis instruction whose instruction format matches the Windows system, and performing synthesis and rendering on the image data of the first display by using the first Windows synthesis instruction, to generate the interface of the first application; and
   wherein the generating the interface of the second application comprises:
      receiving, by the Windows system from the Android system, the image data of the second display and a second synthesis instruction of the image data of the second display; and
      obtaining, based on the second synthesis instruction, a second Windows synthesis instruction whose instruction format matches the Windows system, and performing synthesis and rendering on the image data of the second display by using the second Windows synthesis instruction, to generate the interface of the second application.

5. The method according to claim 3, wherein the method further comprises:
   obtaining, by the Windows system, a first display identity based on an identity of the window of the first application, and obtaining the interface of the first application based on the first display identity; and
   obtaining, by the Windows system, a second display identity based on an identity of the window of the second application, and obtaining the interface of the second application based on the second display identity.

6. The method according to claim 5, wherein the method further comprises:
   in response to switching the first application to a background for running, stopping, by the Windows system, the obtaining of the interface of the first application based on the first display identity.

7. The method according to claim 6, wherein the method further comprises:
   in response to switching the first application to the background for running, stopping, by the Android system, the generating of the image data of the first display, and stopping the sending of the image data of the first display to the Windows system.

8. The method according to claim 3, wherein the method further comprises:
creating, by the Windows system, a first native window corresponding to the first display, and displaying the interface of the first application in the first native window; and
creating, by the Windows system, a second native window corresponding to the second display, and displaying the interface of the second application in the second native window.

9. The method according to claim 1, wherein the screen recording of the content displayed on the window of the first application comprises:
recording, by the electronic device, an image of the window of the first application;
recording, by the electronic device, an audio of the first application; or
recording, by the electronic device, an image and an audio of the window of the first application.

10. The method according to claim 1, wherein the screen recording of the content displayed on the window of the second application comprises:
recording, by the electronic device, an image of the window of the second application.

11. A multi-application screen recording method comprising:
receiving a first operation in a window of a first application on an electronic device;
in response to receiving the first operation, screen recording, by the electronic device, a content displayed on the window of the first application;
receiving a second operation in a window of a second application on the electronic device;
in response to receiving the second operation, screen recording, by the electronic device, a content displayed on the window of the second application, wherein the first application and the second application are run in an Android system, and the window of the first application and the window of the second application are displayed in a non-Android system; and
after screen recording the content displayed on the window of the second application for a first duration, stopping, by the electronic device;
generating a first screen recording file based on the content displayed on the window of the first application;
generating a second screen recording file based on the content displayed on the window of the second application, the screen recording of the content displayed on the window of the first application, wherein the non-Android system comprises a Windows system;
generating a first screen recording file based on the content displayed on the window of the first application;
generating a second screen recording file based on the content displayed on the window of the second application;
creating, by the Android system, a first audio track instance corresponding to the window of the first application;
creating, by the Android system, a second audio track instance corresponding to the window of the second application;
obtaining, by the Windows system, a first audio identity based on the identity of the window of the first application, wherein the first audio identity indicates the first audio track instance;
obtaining, by the Windows system, data of the first audio track instance based on the first audio identity, and generating the first screen recording file based on the data of the first audio track instance;
obtaining, by the Windows system, a second audio identity based on the identity of the window of the second application, wherein the second audio identity indicates the second audio track instance; and
obtaining, by the Windows system, data of the second audio track instance based on the second audio identity, and generating the second screen recording file based on the data of the second audio track instance.

12. The method according to claim 10, wherein the method further comprises:
in response to switching the first application to a background for running, stopping, by the Windows system, the obtaining of the data of the first audio track instance based on the first audio identity, and stopping the generating of the first screen recording file based on the data of the first audio track instance.

13. The method according to claim 12, wherein the method further comprises:
in response to switching the first application to the background for running, stopping, by the Android system, the generating of the data of the first audio track instance.

14. An electronic device, comprising:
one or more processors;
a memory; and
a display screen, wherein the memory stores one or more computer programs, the one or more computer programs comprise instructions, and when the instructions are executed by the one or more processors, the electronic device is enabled to
receive a first operation in a window of a first application on the electronic device,
in response to receiving the first operation, screen record a content displayed on the window of the first application,
receive a second operation in a window of a second application on the electronic device,
in response to receiving the second operation, screen record a content displayed on the window of the second application, the first application and the second application are being run in an Android system, and the window of the first application and the window of the second application are displayed in a non-Android system, and
after screen recording the content displayed on the window of the second application for a first duration, stop the screen recording of the content displayed on the window of the first application.

15. The electronic device according to claim 14, wherein when the instructions are executed by the one or more processors, the electronic device is further enabled to:
generate a first screen recording file based on the content displayed on the window of the first application; and
generate a second screen recording file based on the content displayed on the window of the second application.

16. The electronic device according to claim 15, wherein the non-Android system comprises a Windows system, and wherein when the instructions are executed by the one or more processors, the electronic device is further enabled to:
create, by the Android system, a first display corresponding to the window of the first application;

create, by the Android system, a second display corresponding to the window of the second application;

generate, by the Windows system, an interface of the first application based on image data of the first display, and generate the first screen recording file based on the interface of the first application; and generate, by the Windows system, an interface of the second application based on image data of the second display, and generate the second screen recording file based on the interface of the second application.

17. The electronic device according to claim 16, wherein when the instructions are executed by the one or more processors, the electronic device is further enabled to:

obtain, by the Windows system, a first display identity based on an identity of the window of the first application, and obtaining the interface of the first application based on the first display identity; and obtain, by the Windows system, a second display identity based on an identity of the window of the second application, and obtaining the interface of the second application based on the second display identity.

18. The electronic device according to claim 17, wherein when the instructions are executed by the one or more processors, the electronic device is further enabled to:

in response to switching the first application to a background for running, stop, by the Windows system, the obtaining of the interface of the first application based on the first display identity.

19. The electronic device according to claim 18, wherein when the instructions are executed by the one or more processors, the electronic device is further enabled to:

in response to switching the first application to the background for running, stop, by the Android system, generating of the image data of the first display, and stop sending of the image data of the first display to the Windows system.

20. The electronic device according to claim 16, wherein when the instructions are executed by the one or more processors, the electronic device is further enabled to:

create, by the Windows system, a first native window corresponding to the first display, and displaying the interface of the first application in the first native window; and create, by the Windows system, a second native window corresponding to the second display, and displaying the interface of the second application in the second native window.

* * * * *

UNITED STATES PATENT AND TRADEMARK OFFICE
CERTIFICATE OF CORRECTION

PATENT NO. : 12,452,483 B2  
APPLICATION NO. : 18/575501  
DATED : October 21, 2025  
INVENTOR(S) : Ma et al.

Page 1 of 1

It is certified that error appears in the above-identified patent and that said Letters Patent is hereby corrected as shown below:

In the Claims

In Column 28, in Claim 7, Line 62, after "stopping" delete "the".

In Column 30, in Claim 12, Line 13, delete "claim 10," and insert -- claim 11, --.

Signed and Sealed this  
Ninth Day of December, 2025

John A. Squires  
*Director of the United States Patent and Trademark Office*